(12) United States Patent
Kakinuma et al.

(10) Patent No.: US 10,639,545 B2
(45) Date of Patent: May 5, 2020

(54) GAME SYSTEM, GAME PROGRAM, INFORMATION PROCESSING DEVICE, AND INFORMATION PROCESSING METHOD

(71) Applicant: NINTENDO CO., LTD., Kyoto (JP)

(72) Inventors: Haruka Kakinuma, Kyoto (JP); Masato Mizuta, Kyoto (JP); Hideki Fujii, Kyoto (JP); Kazunobu Shimizu, Kyoto (JP); Koji Sakai, Kyoto (JP); Yusaku Shimizu, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 73 days.

(21) Appl. No.: 15/829,153

(22) Filed: Dec. 1, 2017

(65) Prior Publication Data

US 2018/0185752 A1    Jul. 5, 2018

(30) Foreign Application Priority Data

Jan. 5, 2017    (JP) ................................ 2017-000541

(51) Int. Cl.
| | |
|---|---|
| A63F 13/285 | (2014.01) |
| A63F 13/211 | (2014.01) |
| A63F 13/44 | (2014.01) |
| A63F 13/24 | (2014.01) |
| A63F 13/54 | (2014.01) |
| A63F 13/814 | (2014.01) |

(52) U.S. Cl.
CPC .......... *A63F 13/285* (2014.09); *A63F 13/211* (2014.09); *A63F 13/44* (2014.09); *A63F 13/54* (2014.09); *A63F 13/814* (2014.09); *A63F 13/24* (2014.09)

(58) Field of Classification Search
CPC ...... A63F 13/285; A63F 13/211; A63F 13/25; A63F 13/40; A63F 13/428; A63F 13/843
USPC .......................................................... 463/30
See application file for complete search history.

(56) References Cited

U.S. PATENT DOCUMENTS

| | | |
|---|---|---|
| 6,676,509 B1 | 1/2004 | Bear |
| 2002/0002411 A1 | 1/2002 | Higurashi et al. |

(Continued)

FOREIGN PATENT DOCUMENTS

| | | |
|---|---|---|
| JP | 2000-116945 | 4/2000 |
| JP | 200-218046 | 8/2000 |

(Continued)

OTHER PUBLICATIONS

Office Action dated Jul. 11, 2019 issued in Japanese Application No. 2017-000541 (4 pgs.).
Kojima, et al., U.S. Appl. No. 15/828,998, filed Dec. 1, 2017 (89 pages).
Office Action dated Jun. 28, 2019 issued in U.S. Appl. No. 15/828,998 (23 pgs.).

(Continued)

*Primary Examiner* — Jay Trent Liddle
*Assistant Examiner* — Ryan Hsu
(74) *Attorney, Agent, or Firm* — Nixon & Vanderhye, P.C.

(57) ABSTRACT

An example of a game system includes an operation section, and a vibrating portion provided in the same casing as the operation section. The game system performs a game process based on an output from the operation section. The game system outputs, to the vibrating portion, a vibration signal to cause the vibrating portion to produce a series of vibrations at predetermined points in time during the game process. The game system evaluates a game operation based on operations performed using the operation section in relation to the predetermined points in time.

27 Claims, 17 Drawing Sheets

(56) References Cited

U.S. PATENT DOCUMENTS

| | | |
|---|---|---|
| 2007/0270219 A1 | 11/2007 | Sugioka et al. |
| 2008/0015058 A1 | 1/2008 | Noble et al. |
| 2008/0076566 A1 | 3/2008 | Miyamoto |
| 2008/0132339 A1 | 6/2008 | Taira |
| 2008/0248872 A1 | 10/2008 | Endo |
| 2008/0309615 A1* | 12/2008 | Sato ................ A63F 13/10 345/156 |
| 2009/0295552 A1* | 12/2009 | Shahoian ............ G06F 3/016 340/407.1 |
| 2010/0160045 A1 | 6/2010 | Yamada et al. |
| 2011/0053691 A1* | 3/2011 | Bryant .............. A63F 13/211 463/37 |
| 2012/0229400 A1 | 9/2012 | Birnbaum et al. |
| 2016/0162025 A1 | 6/2016 | Shah |
| 2016/0317383 A1* | 11/2016 | Stanfield ........... A61N 1/36014 |
| 2018/0214771 A1* | 8/2018 | Tran ................. A63F 13/92 |
| 2018/0243647 A1 | 8/2018 | Komori et al. |

FOREIGN PATENT DOCUMENTS

| | | |
|---|---|---|
| JP | 2007-111568 | 5/2007 |
| JP | 2007-296219 A | 11/2007 |
| JP | 2008-000345 | 1/2008 |
| JP | 2008-136681 | 6/2008 |
| JP | 2009-131360 | 6/2009 |
| JP | 2010-142561 | 7/2010 |
| JP | 2013-168124 A | 8/2013 |
| JP | WO2016/136934 | 9/2016 |

OTHER PUBLICATIONS

Notice of Reasons for Refusal dated Jul. 17, 2019 issued in Japanese Application No. 2017-000538 (3 pages).
Japanese Office Action for corresponding JP2017-000538, dated Jan. 23, 2020; 5 pages.

* cited by examiner

GAME SYSTEM, GAME PROGRAM, INFORMATION PROCESSING DEVICE, AND INFORMATION PROCESSING METHOD

CROSS REFERENCE TO RELATED APPLICATION

The disclosure of Japanese Patent Application No. 2017-000541, filed on Jan. 5, 2017, is incorporated herein by reference.

FIELD

The present technique relates to a game system, a game program, an information processing device and an information processing method for a game in which a player performs a game operation using an operation section.

BACKGROUND AND SUMMARY

There are conventional game devices for a game in which a player is allowed to make inputs to the rhythm of a song, etc.

In such conventional games, the player decides appropriate timing of inputs by looking at the game image displayed on a display device. Therefore, with conventional games, the player needs to look at the game image in order to perform an operation, thereby limiting the variety of operations that can be performed, and inhibiting the freedom in operation.

Therefore, the present application discloses a game system, a game program, an information processing device and an information processing method, with which the player is allowed to perform an operation freely.

(1)

An example of a game system described herein includes an operation section, a vibrating portion, a game process section and a vibration signal output section. The vibrating portion is provided in a same casing as the operation section. The game process section performs a game process based on an output from the operation section. The vibration signal output section outputs, to the vibrating portion, a vibration signal to cause the vibrating portion to produce a series of vibrations at predetermined points in time during the game process. The game process section evaluates the game operation based on operations performed using the operation section in relation to the predetermined points in time.

With configuration (1) above, it is possible to allow the player to recognize, by way of a series of vibrations of the vibrating portion, timing for the operations performed using the operation section. Therefore, the player does not need to perform operations while looking at the game image displayed on the screen, allowing the player to perform operations freely and thus improving the degree of freedom in the operation using the controller.

(2)

Another example of a game system described herein includes an operation section, a vibrating portion, a game process section and a vibration signal output section. The vibrating portion is provided in a same casing as the operation section. The game process section performs a game process based on an output from the operation section. The vibration signal output section outputs, to the vibrating portion, a vibration signal configured to vibrate the vibrating portion to a predetermined pattern during the game process. The game process section evaluates a game operation based on the predetermined pattern and points in time at which predetermined operations are performed using the operation section.

With configuration (2) above, it is possible to allow the player to recognize, by way of vibrations of the vibrating portion, the predetermined pattern related to the evaluation of the game operation. Therefore, the player does not need to perform operations while looking at the game image displayed on the screen, allowing the player to perform operations freely and thus improving the degree of freedom in the operation using the controller.

(3)

The vibration signal output section may output, as the vibration signal to the vibrating portion, a signal to cause the vibrating portion to vibrate to the predetermined rhythm. The game process section may evaluate the game operation based on the difference between the predetermined rhythm and the rhythm to which predetermined operations are performed using the operation section.

With configuration (3) above, in a game in which the player performs an operation of inputting a predetermined rhythm, it is possible to allow the player to recognize the rhythm by way of vibrations.

(4)

The game process section may evaluate the game operation based on the difference between the beats of the predetermined pattern and the points in time at which predetermined operations are performed using the operation section.

With configuration (4) above, in a game in which the game operation is evaluated based on the difference between the beats of a predetermined pattern and points in time at which predetermined operations are performed, it is possible to allow the player to recognize the pattern by way of vibrations.

(5)

The game process section may evaluate the game operation based on operations performed using the operation section at points in time or a period of time that are or is determined based on the points in time at which the vibrator vibrates.

With configuration (5) above, it is possible to allow the player to recognize, by way of vibrations, the points in time at which operations should be performed or the period of time during which operations should be performed.

(6)

The vibration signal output section may output, to the vibrating portion, a vibration signal to cause the vibrating portion to produce vibrations of a predetermined pattern before a predetermined operation period. The game process section may evaluate the game operation based on a comparison between the points in time at which operations are performed using the operation section and the predetermined pattern during the predetermined operation period.

With configuration (6) above, it is possible to allow the player to recognize, by way of vibrations, a predetermined pattern, which serves as a reference for the player's operation.

(7)

The game system may include a controller device including the operation section and the vibrating portion. The controller device may include an inertia sensor. The game process section may sense an operation associated with a position and/or an orientation of the controller device based on an output of the inertia sensor to evaluate the game operation based on the sensed operation.

With configuration (7) above, the player can perform the game operation through the operation of moving the controller device. The player does not need to look at the game image displayed on the screen when performing the operation of moving the controller device, allowing the player to perform operations more freely.

(8)

The game process section may evaluate the game operation based on a motion, a position and/or an orientation of the controller device that is identified based on the output of the inertia sensor at points in time that are based on the points in time at which the vibrator vibrates.

With configuration (8) above, it is possible to allow the player to recognize the points in time at which the operation of moving the controller device should be performed by way of vibrations of the controller device.

(9)

The game process section may evaluate the game operation based on a magnitude of a motion of the controller device that is identified based on the output of the inertia sensor over periods of time that are determined based on the points in time at which the vibrator vibrates.

With configuration (9) above, it is possible to allow the player to recognize, by way of vibrations of the controller device, the period of time during which the operation of moving the controller device should be performed.

(10)

The game process section may detect a predetermined operation associated with a position and/or an orientation of the controller device based on the output of the inertia sensor. The game process section may evaluate the game operation based on a comparison between a pattern of vibrations of the vibrating portion and the points in time at which the predetermined operation is performed.

With configuration (10) above, it is possible to allow the player to recognize, by way of vibrations of the controller device, the pattern to which the operation of moving the controller device should be performed.

(11)

The game system may further include a display section configured to display a game image of the game process, the game image not including an image representing the points in time at which the vibrator vibrates.

With configuration (11) above, a game image that does not represent the points in time at which the vibrator vibrates is displayed on the display section, which can encourage the player to not look at the display section. Thus, the player can be encouraged to perform the game operation freely facing toward any direction (e.g., toward another player).

(12)

The game system may include an information processing device that includes at least the game process section and the display section.

With configuration (12) above, when the player performs the game operation, the information processing device is placed in the vicinity of the player. With configuration (1) or (2) above, since the player can perform operations without looking at the game image displayed on the screen, it is possible to freely select the location where the information processing device (i.e., the display section) is placed. That is, the player can play the game while freely placing the information processing device at any location.

(13)

The game system may further include a sound output section configured to output a sound representing the points in time at which the vibrator vibrates.

With configuration (13) above, it is possible to allow the player to recognize, by way of a sound in addition to vibrations, timing for the operations performed using the operation section or the predetermined pattern related to the evaluation of the game operation.

Note that the present specification discloses an example of a game processing method that is carried out on the game system as set forth in (1) to (13) above. The present specification also discloses an example of an information processing device including some of various sections (e.g., the game process section) of the game system as set forth in (1) to (13) above, and discloses an example of a storage medium storing an information processing program or a game program configured to instruct a computer of the information processing device to function as some of various units equivalent to the various sections.

With the game system, the storage medium storing a game program, the information processing device and the information processing method as set forth above, it is possible to allow the player to perform operations freely.

These and other objects, features, aspects and advantages of the present invention will become more apparent from the following detailed description of the present invention when taken in conjunction with the accompanying drawings.

DETAILED DESCRIPTION OF NON-LIMITING EXAMPLE EMBODIMENTS

[1. Configuration of Information Processing System]

An information processing system according to an example of an exemplary embodiment is described below. An example of an information processing system 1 according to the exemplary embodiment includes a main body apparatus (in other words, an information processing device; which functions as a game device main body apparatus in the exemplary embodiment) 2, a left controller 3, and a right controller 4. Each of the left controller 3 and the right controller 4 is attachable to and detachable from the main body apparatus 2. That is, the left controller 3 and the right controller 4 are attached to the main body apparatus 2 and used as a unified device. Further, the main body apparatus 2, the left controller 3, and the right controller 4 can also be used as separate bodies (see FIG. 2). The information processing system 1 can be used in a mode in which the image is displayed on the main body apparatus 2, and another mode in which the image is displayed on a different display device (e.g., a stationary monitor) such as a TV. In the former mode, the information processing system 1 can be used as a portable device (e.g., a portable game device). In the latter mode, the information processing system 1 can be used as a home-console device (e.g., a home-console game device). Note that the information processing system 1 of the exemplary embodiment may include a wireless controller that is not attached to the main body apparatus 2. (Description for Main Body Apparatus, Left Controller, and Right Controller)

Figure 1:
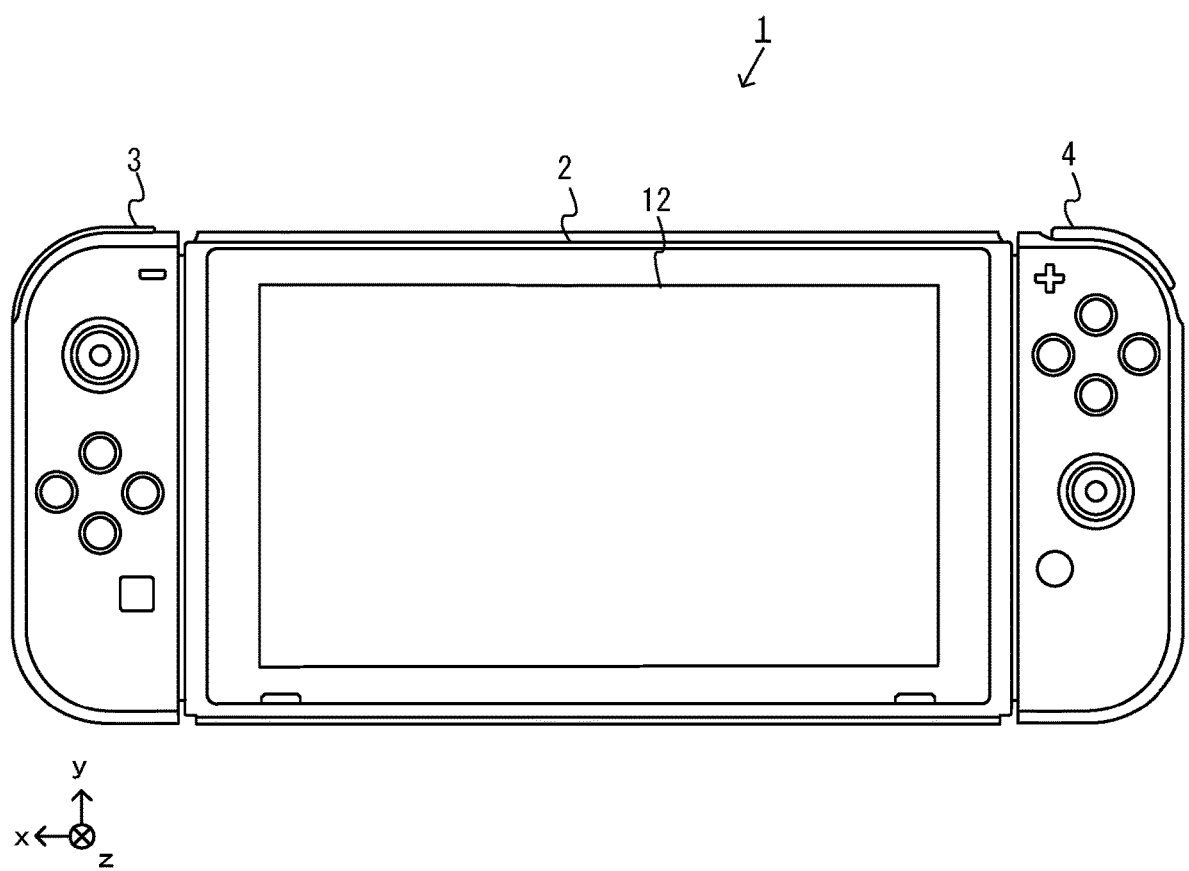
FIG. 1 is a diagram showing a state where an example of a left controller and an example of a right controller are attached to an example of a main body apparatus.

FIG. 1 is a diagram showing a state where the left controller 3 and the right controller 4 are attached to the main body apparatus 2. As shown in FIG. 1, each of the left controller 3 and the right controller 4 is attached to and unified with the main body apparatus 2. The main body apparatus 2 is a device for performing various processes (e.g., game processes) in the information processing system 1. The main body apparatus 2 includes a display 12. Each of the left controller 3 and the right controller 4 is a device including operation sections with which a user provides inputs.

Figure 2:
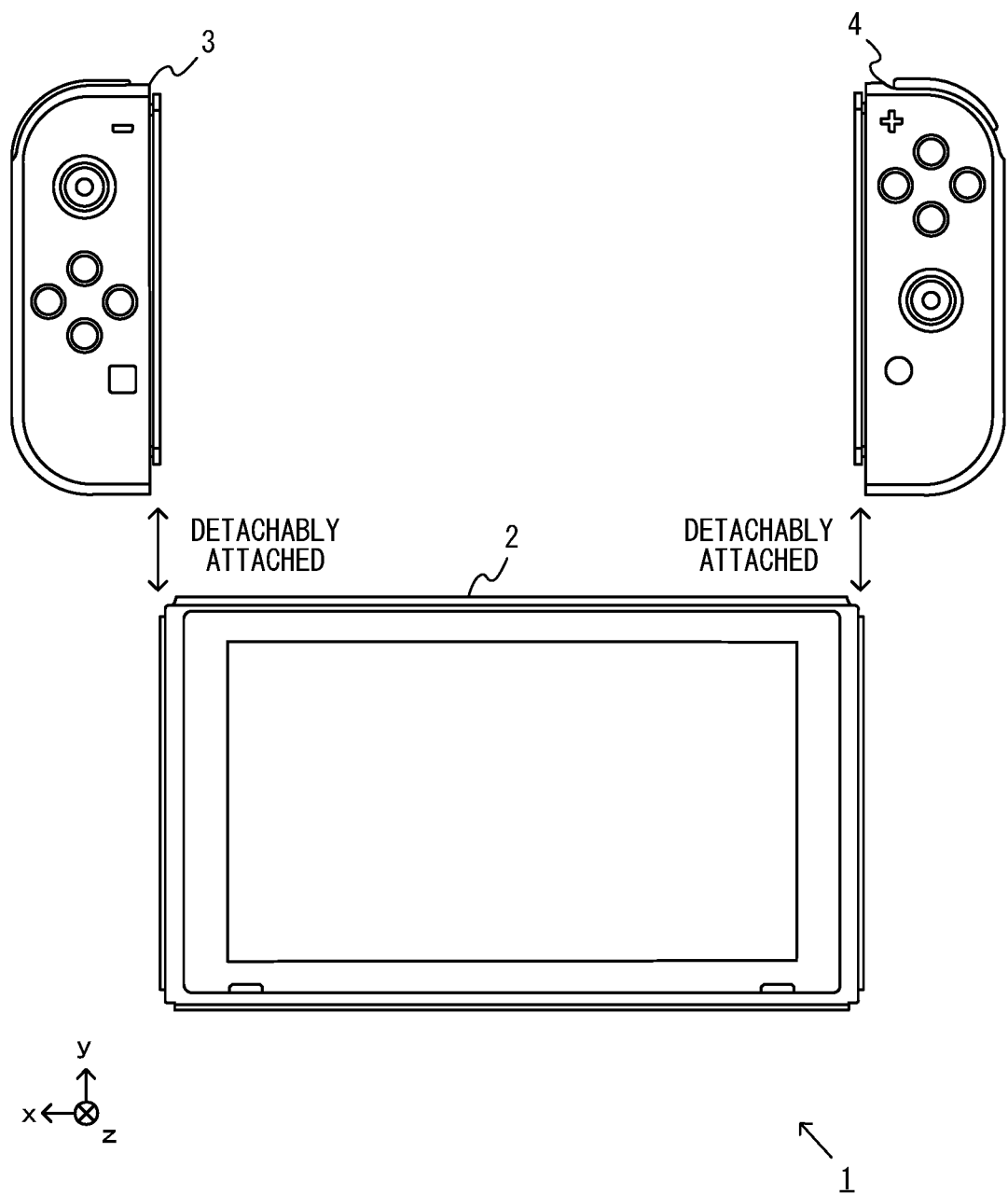
FIG. 2 is a diagram showing a state where an example of a left controller and an example of a right controller are detached from an example of a main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
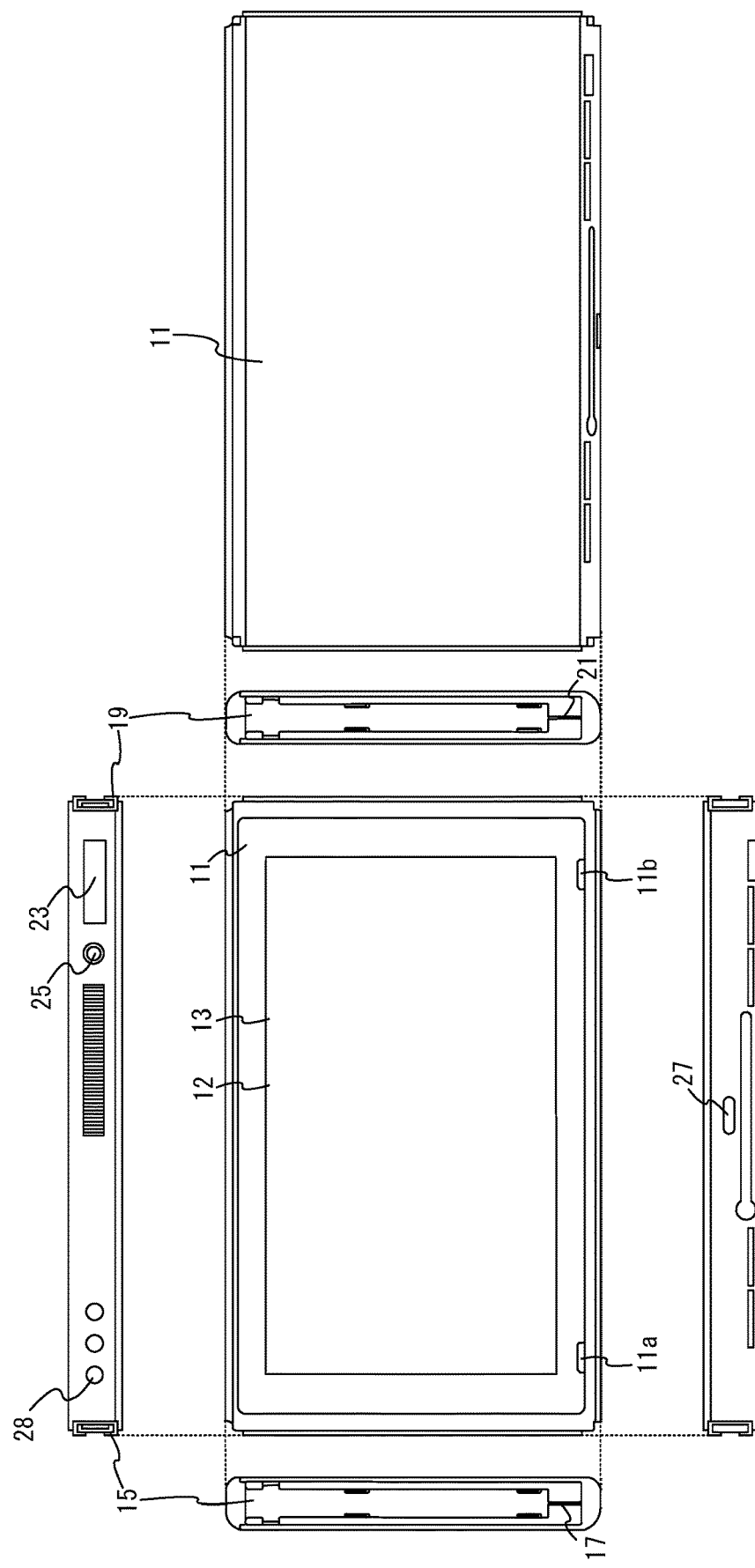
FIG. 3 shows six orthogonal views showing an example of a main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified device obtained by attaching the left controller 3 and the right controller 4 to the main body apparatus 2 may function as a mobile device. The main body apparatus 2 or the unified device may function as a handheld device or a portable device.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a first slot 23. The first slot 23 is provided on an upper side surface of the housing 11. The first slot 23 is so shaped as to allow a first type of storage medium to be attached to the first slot 23. The first type of storage medium is, for example, a dedicated storage medium (e.g., a dedicated memory card) for the information processing system 1 and an information processing device of the same type as the information processing system 1. The first type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified device or the main body apparatus 2 alone is mounted on the cradle, the information processing system 1 can display on a stationary monitor an image generated by and output from the main body apparatus 2. Further, in the exemplary embodiment, the cradle has the function of charging the unified device or the main body apparatus 2 alone mounted on the cradle. Further, the cradle has the function of a hub device (specifically, a USB hub).

Figure 4:
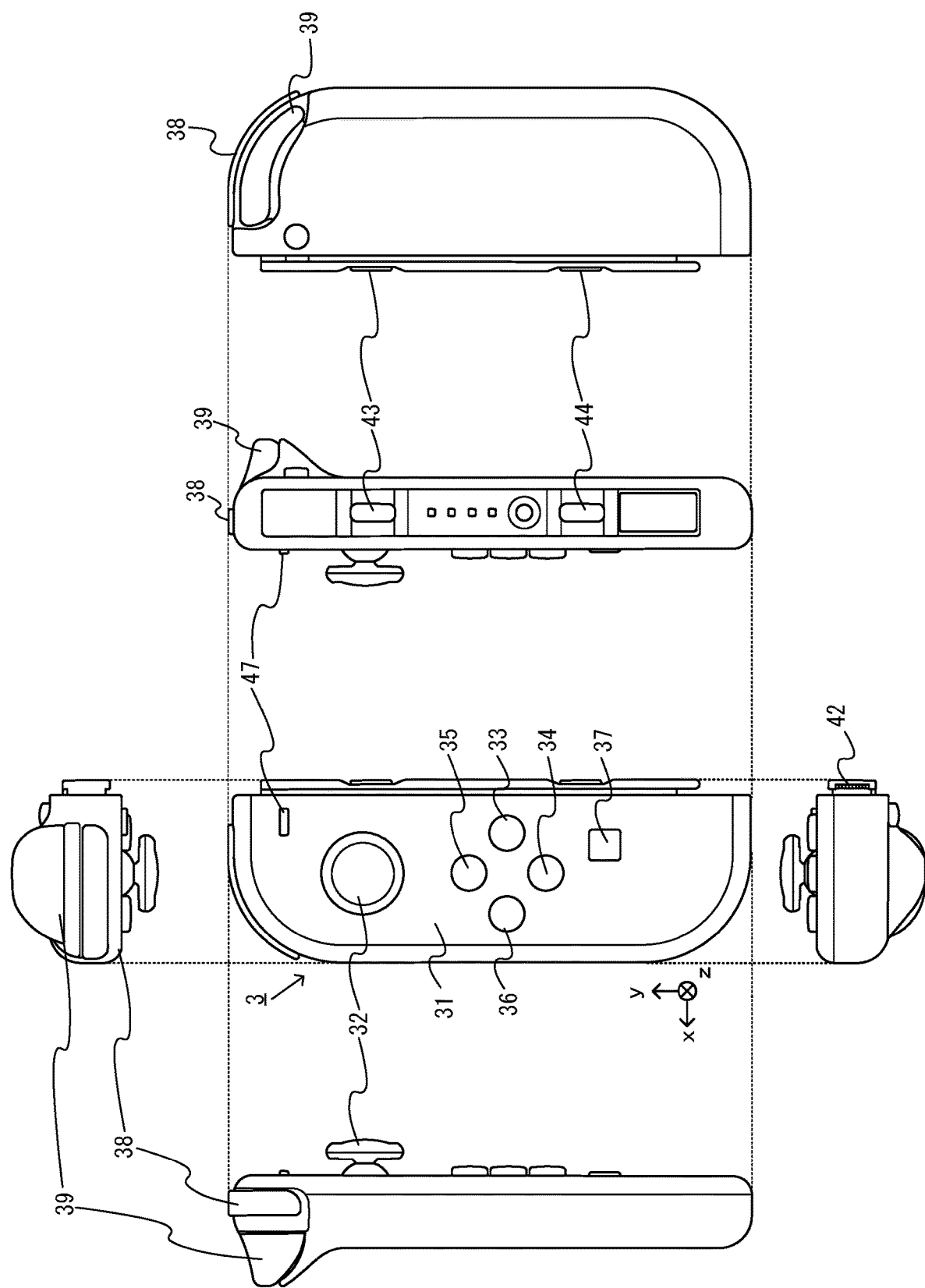
FIG. 4 shows six orthogonal views showing an example of a left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIG. 1). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, an analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that a cross key, a slide stick that allows a slide input, or the like may be provided as the direction input section, instead of the analog stick. Further, in the exemplary embodiment, it is possible to provide an input by pressing the analog stick 32.

The left controller 3 includes various operation buttons. Initially, the left controller 3 includes four operation buttons 33 to 36 (specifically, a right direction button 33, a down direction button 34, an up direction button 35, and a left direction button 36) on the main surface of the housing 31. Further, a record button 37 and a "−" (minus) button 47 are provided. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
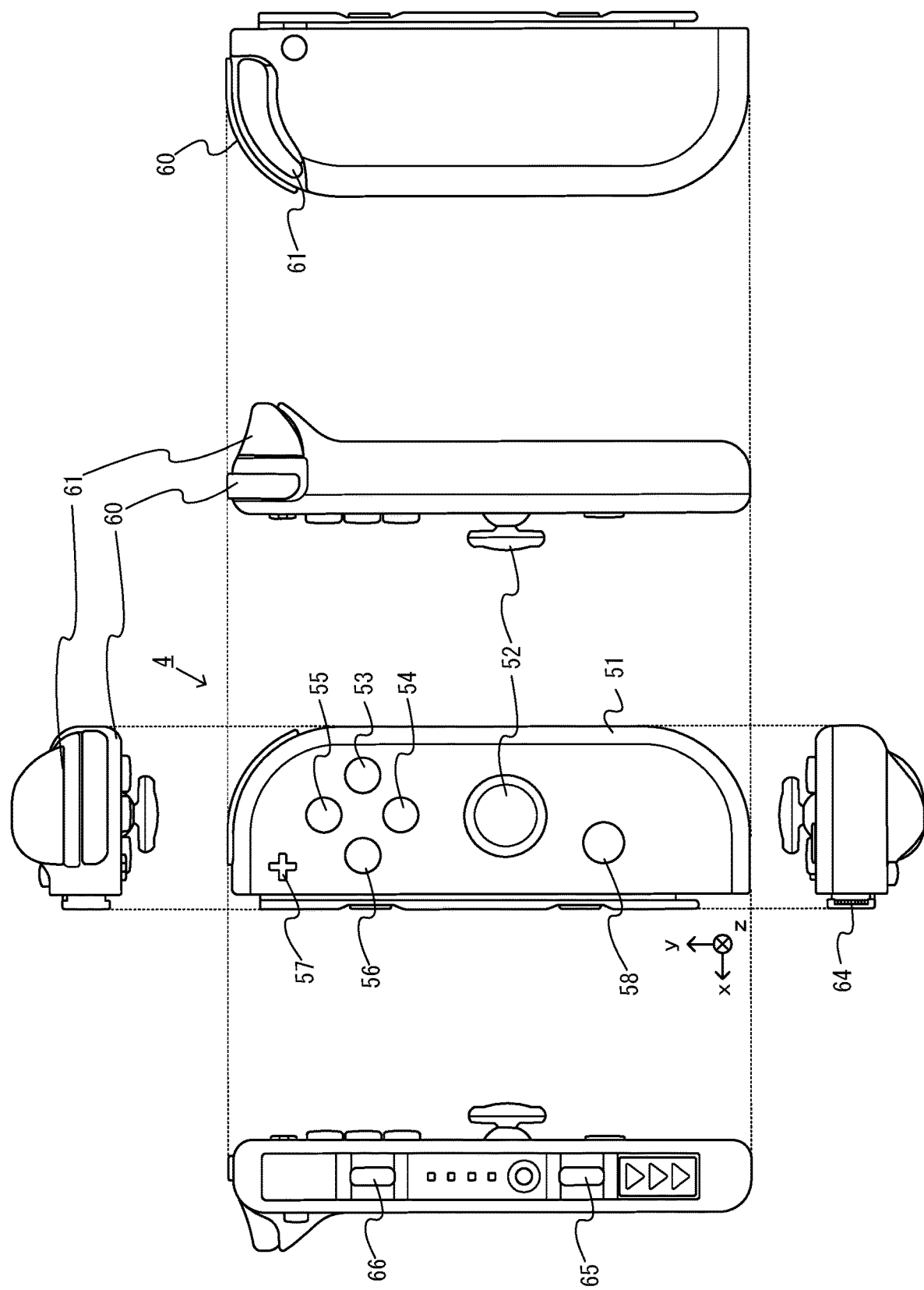
FIG. 5 shows six orthogonal views showing an example of a right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, an analog stick 52 has the same configuration as that of the analog stick 32 of the left controller 3. Further, a cross key, a slide stick that allows a slide input, or the like may be provided instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, a "+" (plus) button 57 and a home button 58 are provided. Further, the right controller 4 includes a first R-button 60 and a ZR-button 61 in an upper right portion of a side surface of the housing 51. Further, similarly to the left controller 3, a second L-button 65 and a second R-button 66 are provided.

Further, the right controller 4 includes a terminal 64 for the right controller 4 to perform wired communication with the main body apparatus 2.

Figure 6:
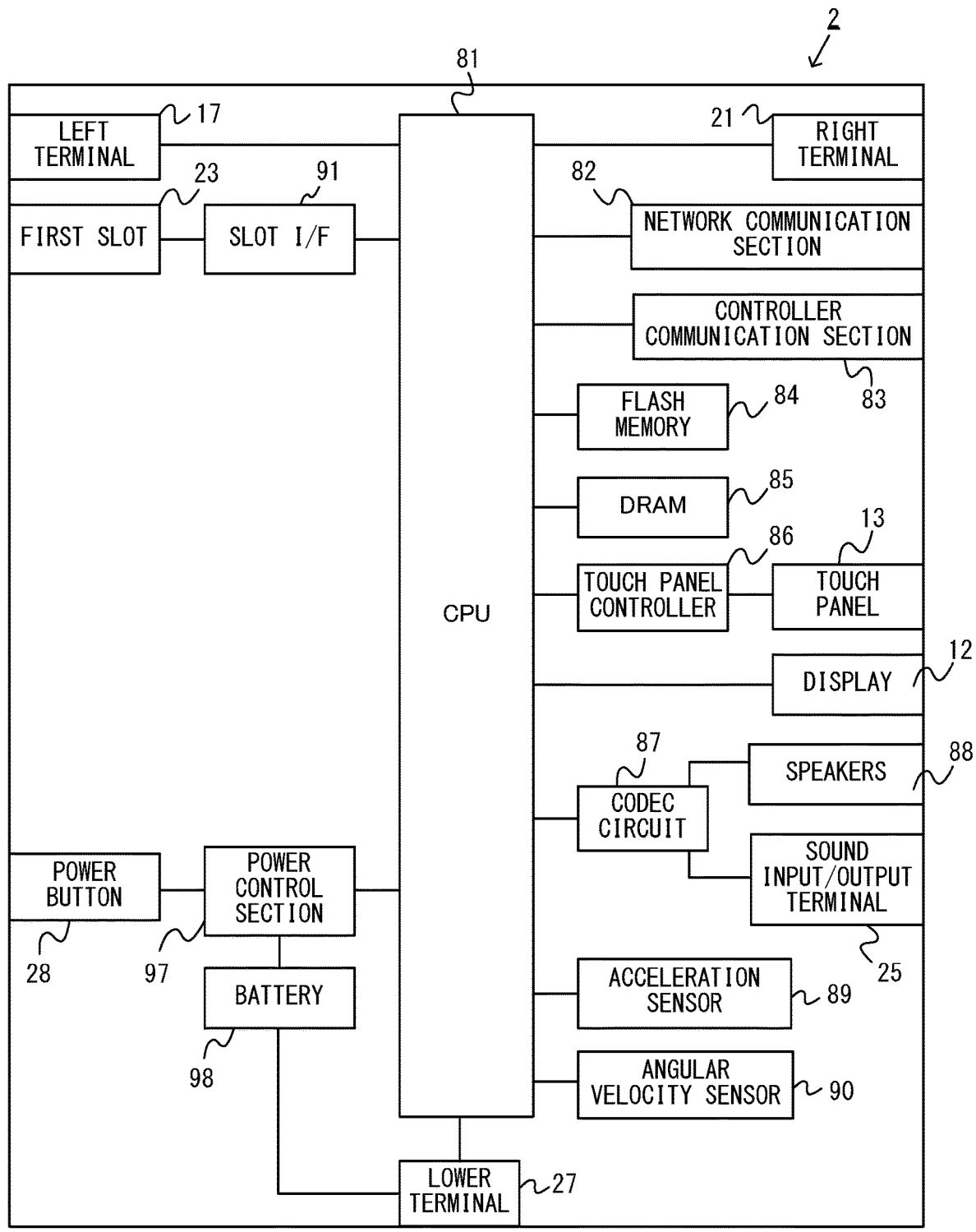
FIG. 6 is a block diagram showing an example of an internal configuration of the main body apparatus.

FIG. 6 is a block diagram showing an example of the internal configuration of the main body apparatus 2. The main body apparatus 2 includes components 81 to 98 shown in FIG. 6 in addition to the components shown in FIG. 3. Some of the components 81 to 98 may be mounted as electronic components on an electronic circuit board and accommodated in the housing 11.

The main body apparatus 2 includes a CPU (central processing unit) 81. The CPU 81 is an information processing section for executing various types of information processing to be executed by the main body apparatus 2, and, strictly, is a SoC (system-on-a-chip) having a plurality of functions such as a CPU function and a GPU function. The CPU 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the CPU 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the CPU 81. The slot I/F 91 is connected to the first slot 23, and in accordance with an instruction from the CPU 81, reads and writes data from and to the first type of storage medium (e.g., a dedicated memory card) attached to the first slot 23.

The CPU 81 appropriately reads and writes data from and to the flash memory 84, the DRAM 85, and each of the above storage media, thereby performing the above information processing.

The main body apparatus 2 includes a network communication section 82. The network communication section 82 is connected to the CPU 81. The network communication section 82 communicates (specifically, through wireless communication) with an external device via a network. In the exemplary embodiment, as a first communication form, the network communication section 82 connects to a wireless LAN and communicates with an external device, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the CPU 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The CPU 81 is connected to the left terminal 17, the right terminal 21, and the lower terminal 27. When performing wired communication with the left controller 3, the CPU 81 transmits data to the left controller 3 via the left terminal 17 and also receives operation data from the left controller 3 via the left terminal 17. Further, when performing wired communication with the right controller 4, the CPU 81 transmits data to the right controller 4 via the right terminal 21 and also receives operation data from the right controller 4 via the right terminal 21. Further, when communicating with the cradle, the CPU 81 transmits data to the cradle via the lower terminal 27. As described above, in the exemplary embodiment, the main body apparatus 2 can perform both wired communication and wireless communication with each of the left controller 3 and the right controller 4. Further, when the unified device obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a user can provide inputs to the main body apparatus 2 by using the plurality of left controllers 3 and the plurality of right controllers 4.

The main body apparatus 2 includes a touch panel controller 86, which is a circuit for controlling the touch panel 13. The touch panel controller 86 is connected between the touch panel 13 and the CPU 81. Based on a signal from the touch panel 13, the touch panel controller 86 generates, for example, data indicating the position where a touch input is provided. Then, the touch panel controller 86 outputs the data to the CPU 81.

Further, the display 12 is connected to the CPU 81. The CPU 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the CPU 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, an acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the CPU 81, and the detection results of the acceleration sensor 89 and the angular velocity sensor 90 are output to the CPU 81. Based on the detection results of the acceleration sensor 89 and the angular velocity sensor 90, the CPU 81 can calculate information regarding the motion and/or the orientation of the main body apparatus 2. Note that while an acceleration sensor and an angular velocity sensor are used in the exemplary embodiment as inertia sensors for calculating the motion, orientation and/or position of the main body apparatus 2, other types of sensors may be used in other embodiments.

The main body apparatus 2 includes a power control section 97 and a battery 98. The power control section 97 is connected to the battery 98 and the CPU 81. Further, although not shown in FIG. 6, the power control section 97 is connected to components of the main body apparatus 2 (specifically, components that receive power supplied from the battery 98, the left terminal 17, and the right terminal 21). Based on a command from the CPU 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
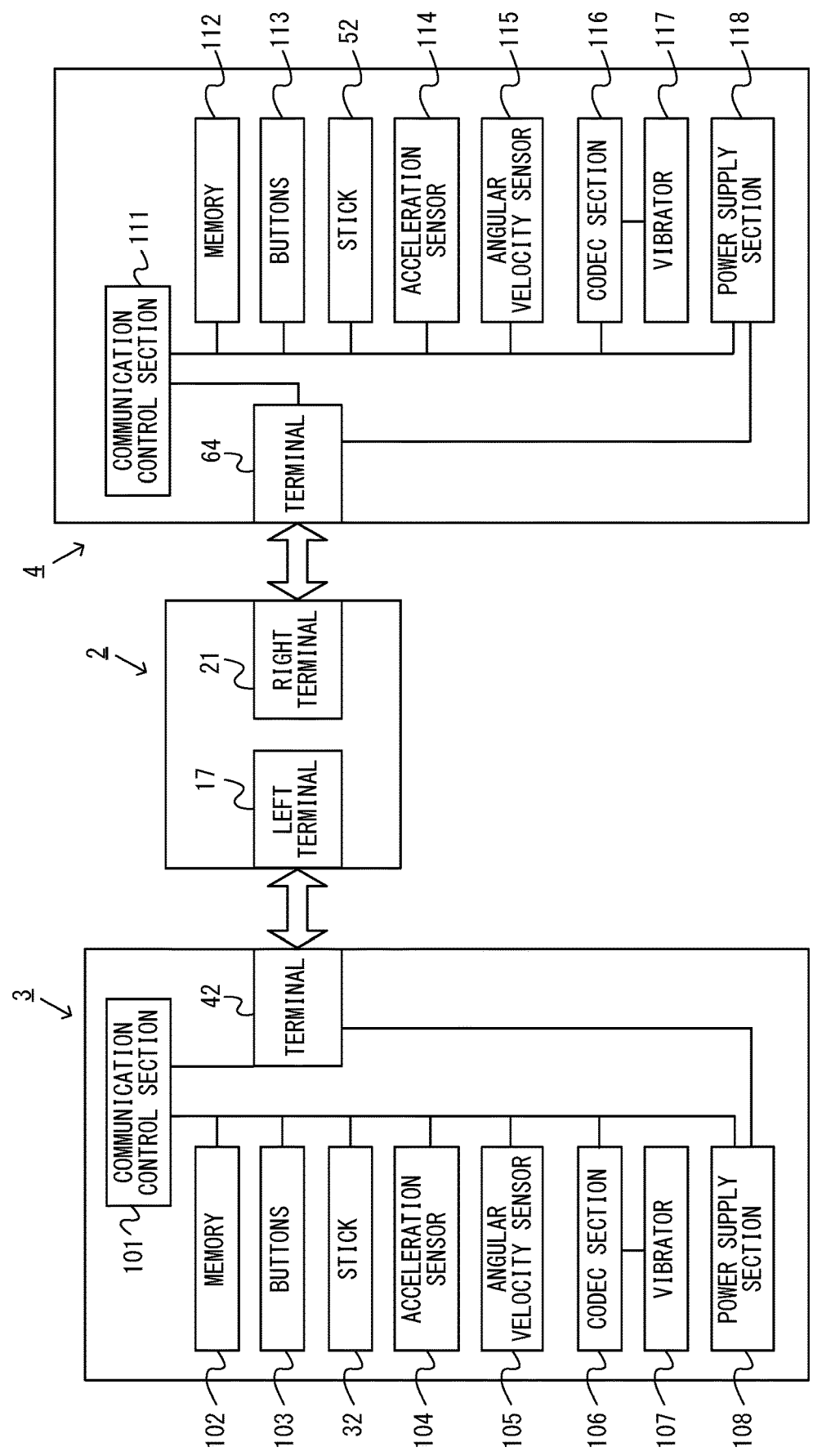
FIG. 7 is a block diagram showing an example of an internal configuration of the main body apparatus, the left controller and the right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44 and 47). Further, the left controller 3 includes the analog stick ("stick" in FIG. 7) 32. Each of the buttons 103 and the analog stick 32 outputs information regarding an operation performed on itself to the communication control section 101 repeatedly with appropriate timing.

The left controller 3 includes inertial sensors. Specifically, an acceleration sensor 104 is provided. Further, an angular velocity sensor 105 is provided. In the exemplary embodiment, an acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly with appropriate timing.

The communication control section 101 acquires information regarding an input (specifically, information regarding an operation, or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by way of vibrations. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, information indicating the waveform itself may be transmitted. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (specifically, an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes a power supply section 118. The power supply section 118 has a function similar to that of the power supply section 108 of the left controller 3 and operates similarly to the power supply section 108.

[2. Outline of Processes Performed on Information Processing System]

Figure 8:
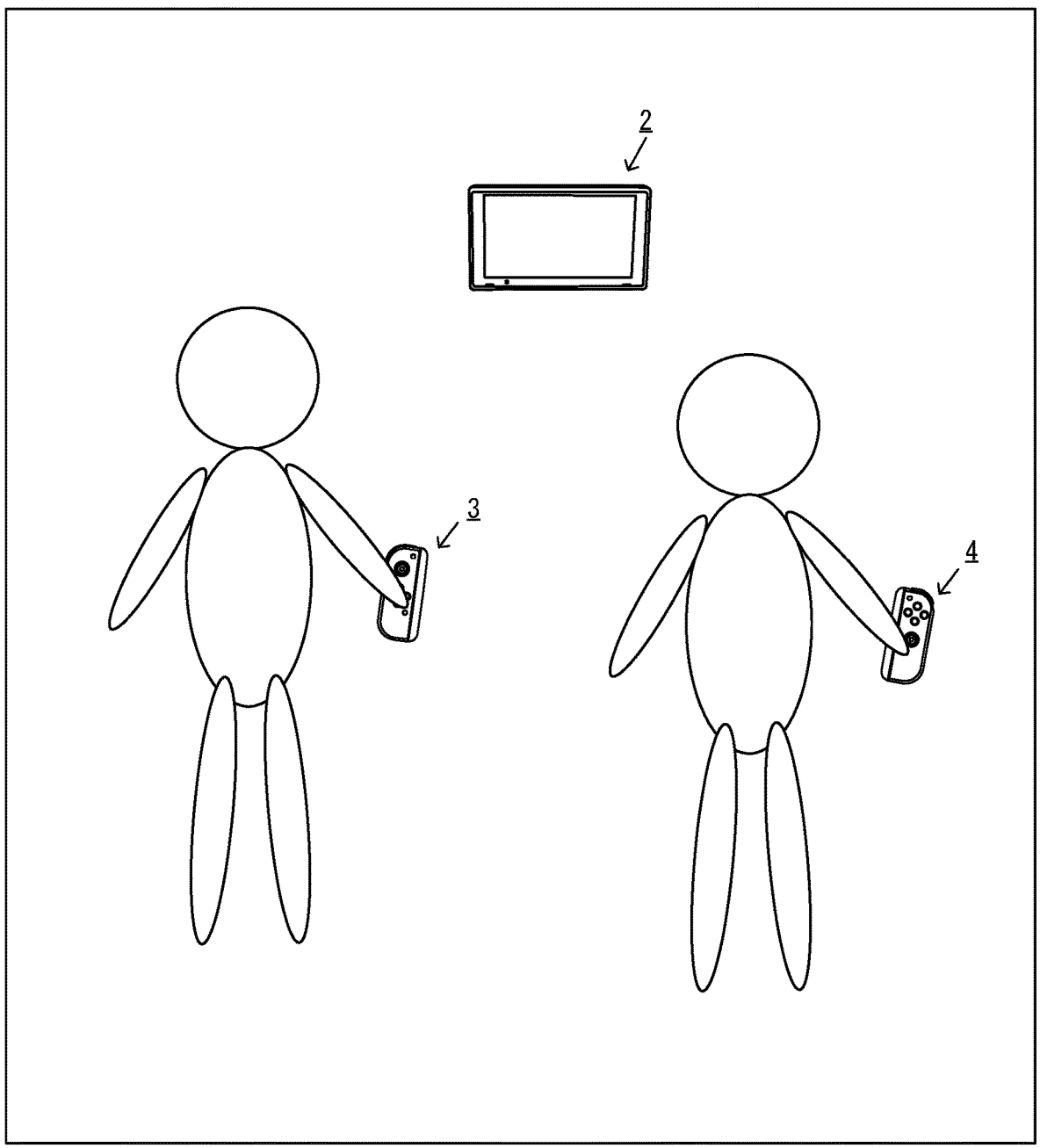
FIG. 8 is a diagram showing an example of how an information processing system of the exemplary embodiment is used.
Figure 9:
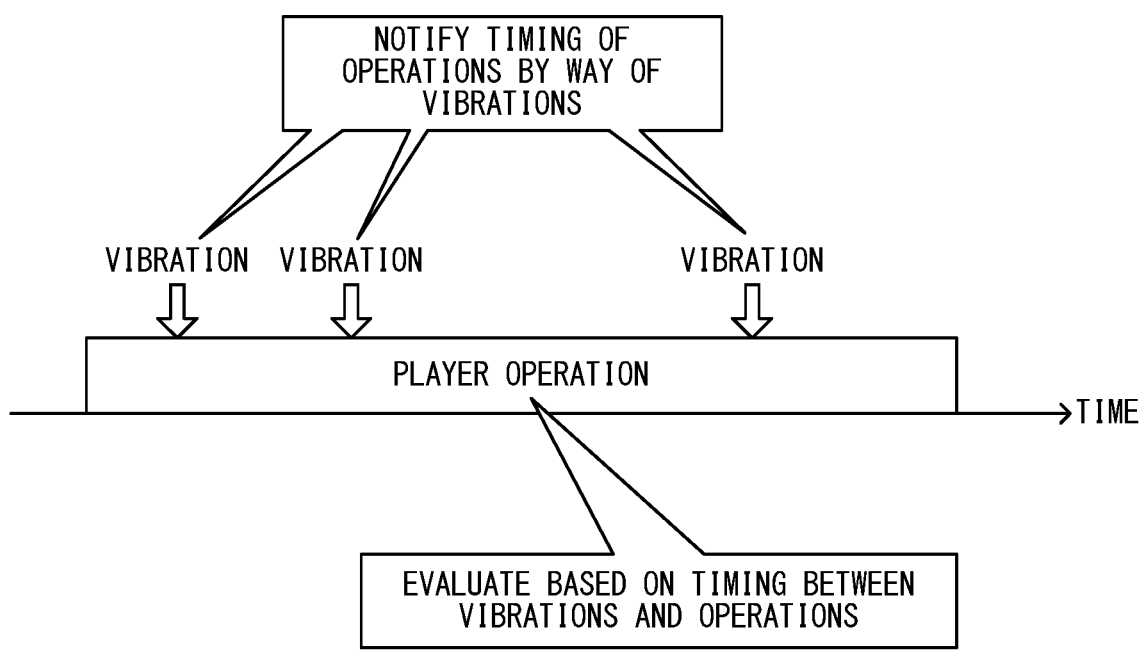
FIG. 9 is a diagram showing an example of a relationship between an operation using a controller and vibrations produced on the controller.

Next, referring to FIG. 8 and FIG. 9, processes to be performed on the information processing system 1 will be outlined. FIG. 8 is a diagram showing how the information processing system of the exemplary embodiment is used. As shown in FIG. 8, in the exemplary embodiment, players use their controllers detached from the main body apparatus 2. The main body apparatus 2 is placed in the vicinity of the players.

In the exemplary embodiment, one player (in other words, user) uses one controller. Note that in game examples to be described later, two players may each use one controller to play the game, as shown in FIG. 8. Note that in other embodiments, one player may use two controllers. For example, a player may play the game holding one controller in each hand.

FIG. 9 is a diagram showing an example of a relationship between an operation using the controller and vibrations produced on the controller. As shown in FIG. 9, in the exemplary embodiment, during the period in which the player performs operations using the controller, the information processing system 1 vibrates the controller held by the player at appropriate points in time. That is, the main body apparatus 2 transmits, to the controller, a command for actuating the vibrator 107 or 117 of the controller so as to vibrate the vibrator 107 or 117.

In the exemplary embodiment, the information processing system 1 notifies the player of the timing (or the period) of the operation of the controller, by way of vibrations of the controller. For example, the information processing system 1 notifies the player of the timing or the period of the operation of the controller by way of a series of vibrations produced at predetermined points in time, the details of which will be described later. For example, in a game in which the controller is operated to a certain pattern (in other words, rhythm), the information processing system 1 notifies the player of the pattern by way of a series of vibrations. The information processing system 1 evaluates the game operation (in other words, performs a game evaluation) based on the timing of vibrations of the controller and the operations of the controller.

As described above, in the exemplary embodiment, the player can know the timing of operations of the controller by way of vibrations of the controller. Therefore, the player does not need to perform operations while looking at the game image displayed on the screen of the main body apparatus 2 (or the stationary monitor described above).

For example, the player can perform operations while looking at another player or can perform operations while moving around without thinking about where the screen is located, and it is therefore possible with the exemplary embodiment to improve the degree of freedom in the operation using the controller.

[3. Game Examples Using Information Processing System]

Game examples to be executed on the information processing system 1 of the exemplary embodiment will now be described. The information processing system 1 can allow the player to play a game as will be described below, for example, by vibrating the controller at appropriate points in time while the game process is executed. Note that the information processing system 1 may execute the game process of one or more of the first to fourth game examples to be described below.

3-1: First Game Example

Figure 10:
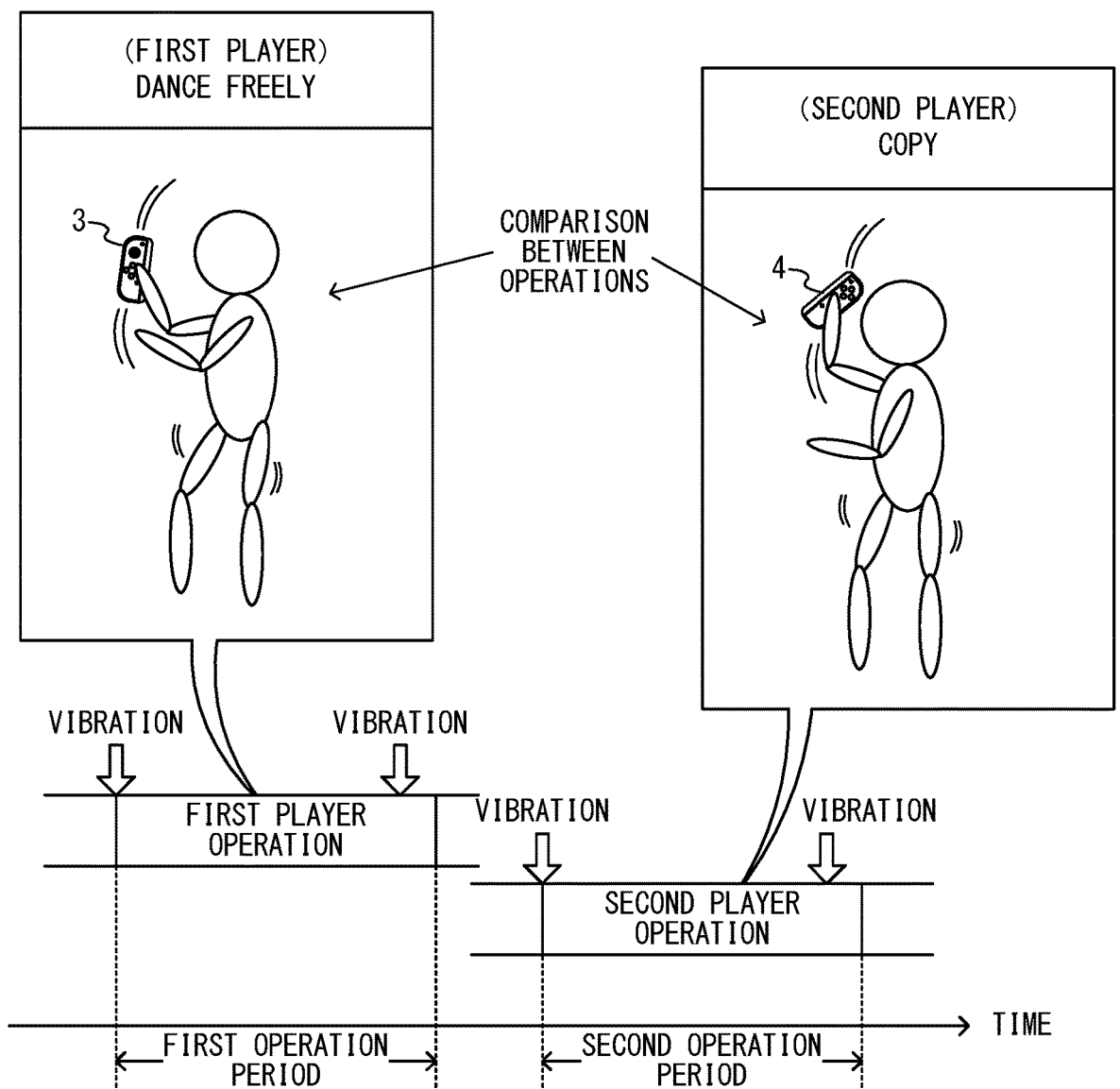
FIG. 10 is a diagram showing an outline of a first game example.

A first game example will be described with reference to FIG. 10 and FIG. 11. FIG. 10 is a diagram showing an outline of the first game example. The first game example is a multi-player game that is played by two players, and is a game in which the first player freely makes a move (specifically, strikes a pose after a dance move), and the other, second player attempts to copy the move. Note that in the following description, the player holding the left controller 3 will be referred to as the first player and the player holding the right controller 4 as the second player.

(Outline of First Game Example)

As shown in FIG. 10, in the first game example, after the start of the game, the period in which the first player performs operations (referred to as the "first operation period") and the period in which the second player performs operations (referred to as the "second operation period") alternate with each other.

Here, in the exemplary embodiment, the information processing system 1 allows each player to operate the controller by moving the controller around. Therefore, before the start of the game, the information processing system 1 may give a tutorial for allowing the player to learn the actions that the player should take in the game (this also similarly applies to the other game examples, other than the first game example).

After the start of the game, the information processing system 1 outputs a game sound such as a BGM or a sound effect, for example, from the speakers 88. The game sound may be a sound that is capable of allowing the player to recognize the upcoming first operation period. When the first operation period has come (i.e., at the start of the first operation period), the information processing system 1 vibrates the left controller 3 held by the first player (see FIG. 10). The first player can know the start of the first operation period by the vibration of the left controller 3, upon which the first player starts the action (in other words, operation) of striking a pose after a dance move. Note that in the first game example, each player performs the game operation by performing the action as described above with the controller held in one hand (see FIG. 10). Thus, the player performs the action so as to move at least the hand holding the controller.

In the exemplary embodiment, the first operation period has a predetermined length. While there is no particular limitation on the length of the first operation period, it may be such a length that the player can make a short move (e.g., a turn) and then strike a pose (e.g., 1 to 3 seconds), for example.

At a point in time that is a predetermined period of time before the end of the first operation period, the information processing system 1 vibrates the left controller 3 again (see FIG. 10). This vibration is for notifying the first player of the time to strike a pose. That is, in response to this vibration of the left controller 3, the first player strikes a pose. Also by this vibration, the first player can know that the first operation period is to end.

Note that there is no particular limitation on the points in time at which the left controller 3 vibrates as long as they are associated with the start or the end of the first operation period. That is, the points in time at which the left controller 3 vibrates may be determined based on the start or the end of the first operation period. For example, taking into consideration the time lag between when the left controller 3 vibrates and when the first player starts performing the operation, the information processing system 1 may vibrate the left controller 3 a predetermined period of time before the start of the first operation period, in other embodiments. The information processing system 1 may produce the second vibration of the left controller 3 at the end of the first operation period.

Note that the manner of vibration (e.g., the magnitude, frequency and/or pattern of vibration) may be the same or different between the vibration associated with the start of an operation period (i.e., the first operation period or the second operation period to be described below) and the vibration associated with the end of the operation period. By varying the manner of vibration between the two vibrations described above, it is possible to notify the player of the start and the end of the first operation period in an easier-to-understand manner.

As shown in FIG. 10, the second operation period comes after the first operation period. Also before and after the second operation period, as with the first operation period, the information processing system 1 may output, from the speakers 88, a sound that is capable of allowing the player to recognize the upcoming second operation period. When the second operation period has come (i.e., at the start of the second operation period), the information processing system 1 vibrates the right controller 4 held by the second player (see FIG. 10). The second player can know the start of the second operation period by the vibration of the right controller 4, upon which the second player starts copying the move of the first player (i.e., performs the same dance move and strikes the same pose as the first player).

In the exemplary embodiment, the second operation period has a predetermined length, which is the same as the length of the first operation period. At a point in time that is a predetermined period of time before the end of the second operation period, the information processing system 1 vibrates the right controller 4 again (see FIG. 10). This vibration is for notifying the second player of the time to strike a pose. That is, in response to this vibration of the right controller 4, the second player strikes a pose, copying the first player. Also by this vibration, the second player can know that the second operation period is to end.

Note that as with the left controller 3, there is no particular limitation on the points in time at which the right controller 4 vibrates as long as they are associated with the start or the end of the second operation period. The manner of vibration may be the same or different between the vibration associated with the start of the second operation period and the vibration associated with the end of the second operation period.

Also, the manner of vibration may be the same or different between the vibration for the first operation period and the vibration for the second operation period. By varying the manner of vibration between the two operation periods, it is possible to notify each player of the player's role (i.e., the role of being copied by the other player or the role of copying the other player) in an easier-to-understand manner.

In the first game example, at a point in time at which the controller vibrates, the information processing system 1 outputs a sound representing the point in time. For example, a sound effect may be output at a point in time at which the controller vibrates. For example, a BGM may be output such that a sound is output at each point in time the controller vibrates (in other words, the timing of vibrations may be set so that the controller vibrates to the rhythm of the BGM).

Note that in the first and second operation periods described above, the display 12 of the main body apparatus 2 does not display an image representing points in time at which the controller vibrates (in other words, an image representing the operation periods), but displays another game image.

After the end of the second operation period, the information processing system 1 evaluates the game operation performed by a player. In the first game example, the game operation performed by the second player is evaluated. That is, the information processing system 1 evaluates how well the operation by the first player (in other words, the action of the first player during the first operation period) is copied by the operation by the second player (in other words, the action of the second player during the second operation period). Specifically, the information processing system 1 compares the operation by the first player during the first operation period with the operation by the second player during the second operation period. The higher the similarity is between the operation by the first player and the operation by the second player, the better the evaluation is.

There is no particular limitation on the specific method of comparing the two operations with each other. In the exemplary embodiment, the degree of similarity in motion and orientation between the two controllers during the operation periods is calculated, and the evaluation is made based on the degree of similarity. Specifically, the information processing system 1 calculates the degree of similarity (referred to as the "first degree of similarity") between the waveform of output data from the acceleration sensor 104 of the left controller 3 during the first operation period and the waveform of output data from the acceleration sensor 114 of the right controller 4 during the second operation period. The first degree of similarity indicates the degree of similarity in motion between the two controllers. Note that the information processing system 1 may calculate the degree of similarity between waveforms of data that are calculated from the output data from the acceleration sensors of the controllers (e.g., waveforms that are obtained through frequency conversion of the output data), instead of the degree of similarity between the waveforms of the output data themselves.

The information processing system 1 also calculates the degree of similarity (referred to as the "second degree of similarity") between the orientation of the left controller 3 when posing (in other words, when the controller vibrates at the end of the operation period) and that of the right controller 4. The second degree of similarity indicates the degree of similarity in orientation between the two controllers. Note that the orientation of a controller can be calculated based on the output from the angular velocity sensor of the controller. As described above, in the exemplary embodiment, the information processing system 1 calculates the first degree of similarity with respect to the motion of the players during the operation periods, and the second degree of similarity with respect to the orientations of the players during the operation period (specifically, the orientations when posing).

In the exemplary embodiment, the information processing system 1 evaluates the game operation based on the first degree of similarity and the second degree of similarity described above. That is, the evaluation is made so that the higher the first degree of similarity is and the higher the second degree of similarity is, the better the evaluation is. The evaluation result is calculated as a score, for example. The calculated evaluation result may be represented in any form, e.g., as the level of the player or as the winner between the first player and the second player in the first game example.

When the evaluation is made, the information processing system 1 presents the evaluation result to the players. That is, the information processing system 1 displays the score representing the evaluation result on the display 12 of the main body apparatus 2. Note that the evaluation result may be presented to the player in any form. For example, in other embodiments, information indicating the winner between the first player and the second player may be presented as the evaluation result. Then, the evaluation can be said to be an evaluation for both the operation by the first player and the operation by the second player.

As described above, in the first game example, the information processing system 1 evaluates the game operation based on an operation that is performed using a controller during a period (i.e., the operation period) that is defined by the points in time at which the controller vibrates. Specifically, the information processing system 1 evaluates the game operation based on a motion and an orientation of the controller that are identified based on the output of the inertia sensor (i.e., the acceleration sensor and/or the angular velocity sensor) at points in time that are based on the points in time at which the controller vibrates. That is, in the first game example, the period in which an operation to be used for evaluation is performed is notified to the player by way of vibrations.

Note that in other embodiments, the information processing system 1 may evaluate the game operation based on at least one of the motion, the position and the orientation of the controller that are identified based on the output of the inertia sensor (this similarly applies also to other game examples).

As described above, in the first game example, by way of vibrations of the controller held by player, the player can know the period in which operations should be performed (i.e., the operation period). Therefore, in the first game example, the players can perform operations without looking at the screen on which the game image is displayed, and the players can easily perform operations while freely moving around. For example, the first and second players can play the game while facing toward each other (without looking at the screen). Thus, in the first game example, it is possible to enjoy the game in a novel manner of playing the game looking at the opponent player instead of looking at the screen.

Note that in other embodiments, the information processing system 1 may further continue the game in a manner described above except the roles of the first player and the second player are switched around. In other embodiments, the information processing system 1 may allow the players to play a plurality of sets, each set including a first leg where the first player copies the second player and a second leg where the second player copies the first player.

(Specific Game Process Example of First Game Example)

Figure 11:
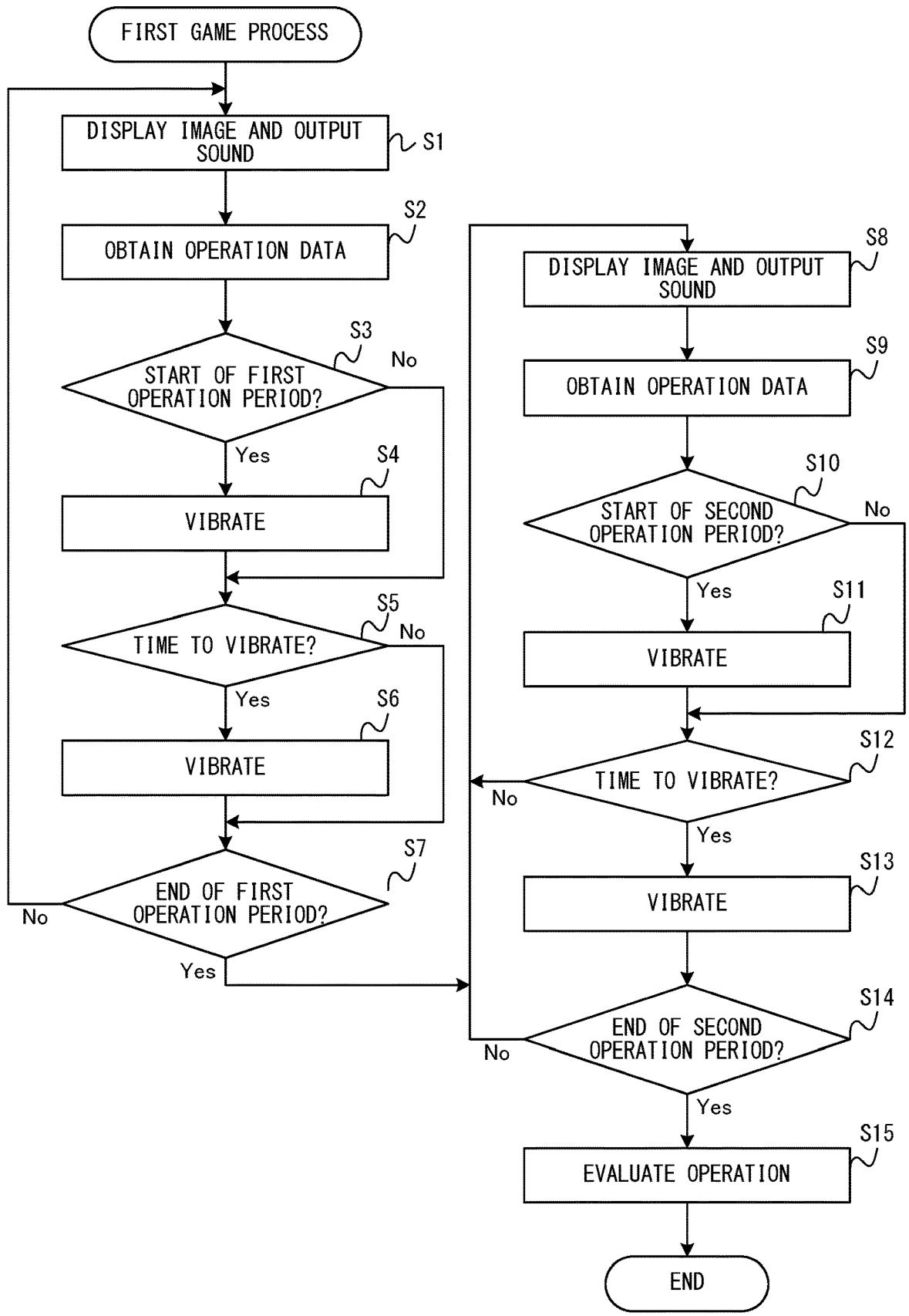
FIG. 11 is a flow chart showing an example flow of a game process of the first game example to be executed on an example of the information processing system.

FIG. 11 is a flow chart showing an example flow of a game process of the first game example (referred to as the "first game process") to be executed on the information processing system. Note that in the exemplary embodiment, a storage section that can be accessed by the information processing system 1 (e.g., a storage medium of the first type, or the flash memory 84) stores a game program including a program of the first game process. The series of processes shown in FIG. 11 is started as the CPU 81 of the main body apparatus 2 executes the program of the first game process.

Note that while the CPU 81 of the main body apparatus 2 executes the processes of the steps shown in FIG. 11 (this similarly applies to FIG. 13, FIG. 15 and FIG. 17) in the exemplary embodiment, the processes of some of the steps of the flow chart may be executed by a processor other than the CPU or a dedicated circuit. The processes of the steps of the flow chart shown in FIG. 11 (this similarly applies to FIG. 13, FIG. 15 and FIG. 17) are merely an example, and the order of steps may be switched around, or other processes may be executed in addition to (or instead of) these steps.

In step S1, the CPU 81 displays a game image on the display 12 and outputs a game sound such as a BGM or a sound effect from the speakers 88. In the exemplary embodiment, before the end of the first operation period, the process of step S1 is executed at a rate of once per a predetermined period of time (i.e., one frame period), thereby outputting a moving image of the game image and a game sound. The process of step S2 is executed, following step S1.

In step S2, the CPU 81 obtains operation data from each controller. That is, the CPU 81 obtains operation data received from each controller via the controller communication section 83, and stores the received operation data in the DRAM 85. Note that in the process of step S2, the CPU 81 at least obtains operation data from the left controller 3. Also, pieces of operation data that are not used for evaluation (i.e., those that are obtained outside the first operation period) do not need to be stored in the DRAM 85. The process of step S3 is executed, following step S2.

In step S3, the CPU 81 determines whether or not the first operation period is to start. That is, the CPU 81 determines whether or not a predetermined point in time that is at the start of the first operation period has come. Note that in the exemplary embodiment, the start and the end of each operation period are predetermined in the game program described above. When the determination result of step S3 is affirmative, the process of step S4 is executed. On the other hand, when the determination result of step S3 is negative, the process of step S5 to be described later is executed, skipping the process of step S4.

In step S4, the CPU 81 vibrates the left controller 3. That is, the CPU 81 transmits a command (in other words, a signal) for vibrating the vibrator 107 of the left controller 3 to the left controller 3 via the controller communication section 83. Note that the command transmitted from the main body apparatus 2 to the controller may be a command that specifies the manner of vibration of the vibrator or may be a command that simply instructs the controller to vibrate. The left controller 3 (specifically, the communication control section 111), having received the command described above, outputs a control signal in accordance with the command to the codec section 106, thereby vibrating the vibrator 107. Thus, the vibrator 107 vibrates, thereby vibrating the left controller 3. The process of step S5 is executed, following step S4.

In step S5, the CPU 81 determines whether or not a point in time at which the controller is vibrated before the end of the first operation period has come. That is, the CPU 81 determines whether or not a point in time that is a predetermined period of time before the end of the first operation period has come. When the determination result of step S5 is affirmative, the process of step S6 is executed. On the other hand, when the determination result of step S5 is negative, the process of step S7 is executed, skipping the process of step S6.

In step S6, the CPU 81 vibrates the left controller 3. The process of step S6 is the same as the process of step S3 described above. Note that when the manner of vibration is varied for each of the controller-vibrating processes (e.g., steps S4, S6, S11, S13, etc.), the CPU 81 transmits a command that specifies a different manner of vibration for each process to the controller. The process of step S7 is executed, following step S6.

In step S7, the CPU 81 determines whether or not the first operation period is to end. That is, the CPU 81 determines whether or not a predetermined point in time that is at the end of the first operation period has come. When the determination result of step S7 is affirmative, the process of step S8 is executed. On the other hand, when the determination result of step S7 is negative, the process of step S1 is executed again.

In step S8, the CPU 81 displays a game image on the display 12 and outputs a game sound such as a BGM or a sound effect from the speakers 88. The process of step S8 is similar to the process of step S1 described above. In the exemplary embodiment, after the end of the first operation period, the process of step S8 described above is executed at a rate of once per a predetermined period of time (i.e., one frame period), thereby outputting a moving image of the game image and a game sound. The process of step S9 is executed, following step S8.

In step S9, the CPU 81 obtains operation data from each controller. The process of step S9 is similar to the process of step S2 described above. Note however that in the process of step S9, the CPU 81 obtains at least the operation data from the right controller 4. Also in step S9, as in step S2, pieces of operation data that are not used for evaluation (i.e., those that are obtained outside the second operation period) do not need to be stored in the DRAM 85. The process of step S10 is executed, following step S9.

In step S10, the CPU 81 determines whether or not to start the second operation period. That is, the CPU 81 determines whether or not a predetermined point in time that is at the start of the second operation period has come. When the determination result of step S10 is affirmative, the process of step S11 is executed. On the other hand, when the determination result of step S10 is negative, the process of step S12 to be described later is executed, skipping the process of step S11.

In step S11, the CPU 81 vibrates the right controller 4. That is, the CPU 81 transmits a command (in other words, a signal) for vibrating the vibrator 117 of the right controller 4 to the right controller 4 via the controller communication section 83. The right controller 4, having received the command described above, outputs a control signal in accordance with the command to the codec section 116, thereby vibrating the vibrator 117. Thus, the vibrator 117 vibrates, and the right controller 4 vibrates. The process of step S12 is executed, following step S11.

In step S12, the CPU 81 determines whether or not a point in time at which the controller is vibrated before the end of the second operation period has come. That is, the CPU 81 determines whether or not a point in time that is a predetermined period of time before the end of the second operation period has come. When the determination result of step S12 is affirmative, the process of step S13 is executed. On the other hand, when the determination result of step S12 is negative, the process of step S14 is executed, skipping the process of step S13.

In step S13, the CPU 81 vibrates the right controller 4. The process of step S13 is the same as the process of step S11 described above. The process of step S14 is executed, following step S13.

In step S14, the CPU 81 determines whether or not the second operation period is to end. That is, the CPU 81 determines whether or not a predetermined point in time that is at the end of the second operation period has come. When the determination result of step S14 is affirmative, the process of step S15 is executed. On the other hand, when the determination result of step S14 is negative, the process of step S8 is executed again.

In step S15, the CPU 81 evaluates the game operation performed by a player. That is, the CPU 81 reads out operation data stored in the DRAM 85 to evaluate the game operation based on the read-out operation data. Note that the specific evaluation process is performed by the method described in "(Outline of first game example)" above. In step S15, the CPU 81 notifies the player of the evaluation result. That is, the CPU 81 generates a game image representing the evaluation result (e.g., a game image representing a score), and displays the game image on the display 12. After step S15, the CPU 81 ends the first game process shown in FIG. 11.

3-2: Second Game Example

Figure 12:
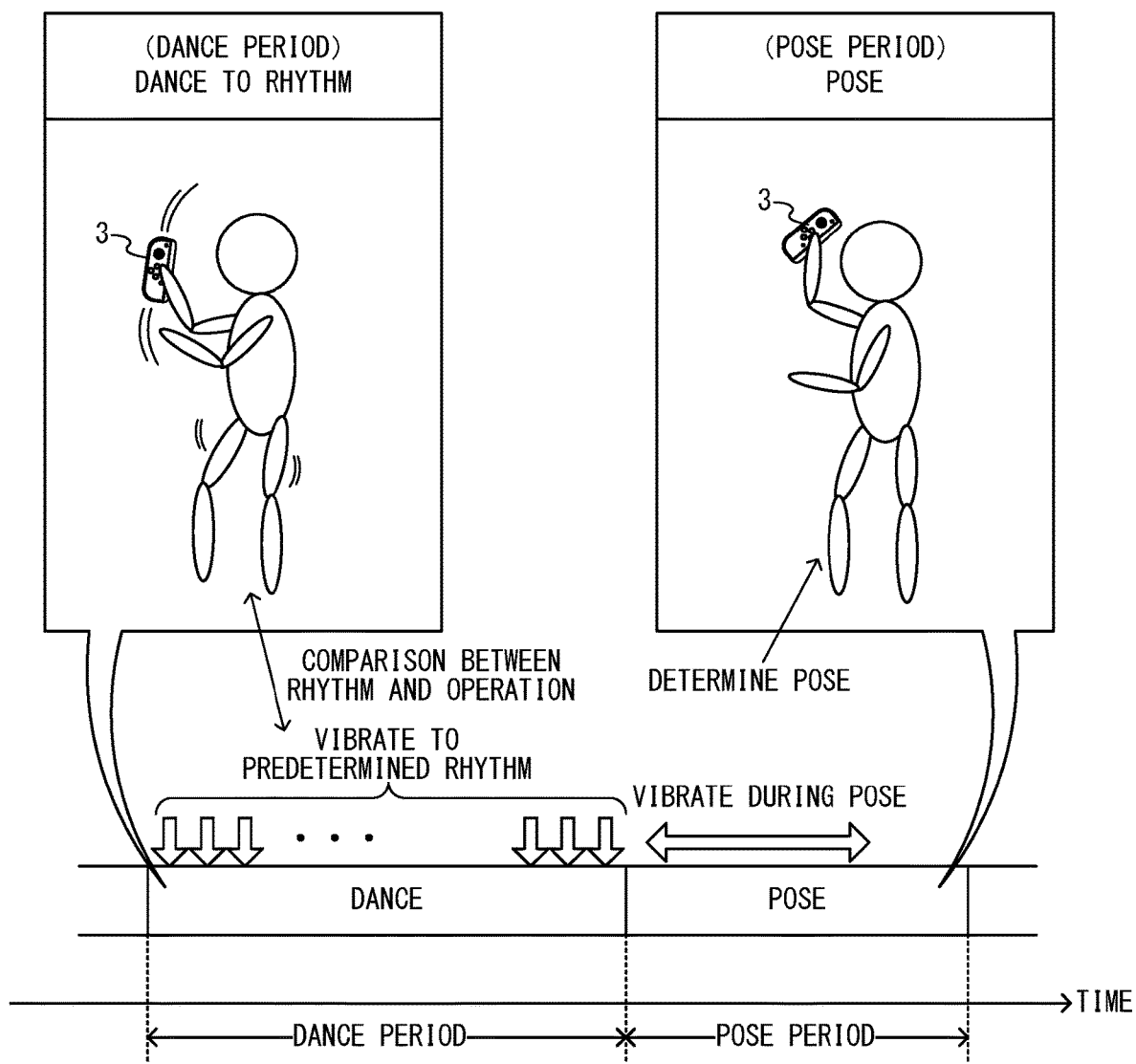
FIG. 12 is a diagram showing an outline of a second game example.

A second game example will be described with reference to FIG. 12 and FIG. 13. FIG. 12 is a diagram showing an outline of the second game example. The second game example is a single-player game, in which the player performs an action (in other words, operation) of dancing during a predetermined dance period, and performs an operation of striking a pose during a predetermined pose period. In the second game example, the game operation is evaluated based for example on whether the player is dancing to the rhythm during the dance period and striking a pose during the pose period. Note that since the player uses one controller in the second game example, a plurality of players can play the game simultaneously by using a plurality of controllers.

(Outline of Second Game Example)

As shown in FIG. 12, in the second game example, the dance period comes after the start of the game. Here, after the start of the game, the information processing system 1 outputs a game sound such as a BGM or a sound effect, for example, from the speakers 88. The game sound may be a sound that is capable of allowing the player to recognize the upcoming dance period.

As shown in FIG. 12, during the dance period, the player performs a dance operation by dancing with the controller (herein, the left controller 3) held in one hand. Note that the player is allowed to move freely as long as the player moves the hand that is holding the left controller 3.

During the dance period, the information processing system 1 vibrates the left controller 3 held by the player to a predetermined rhythm (or a "predetermined pattern") (see FIG. 12). The rhythm may be a succession of vibrations with regular intervals or may be a repetition of a certain vibration pattern. The player dances to the rhythm represented by the vibrations of the left controller 3. Then, since the player can recognize the rhythm by way of vibrations of the left controller 3, the player can freely perform the dance operation without looking at the game image displayed on the display 12 of the main body apparatus 2. Note that the more vigorously the player dances during the dance period (i.e., the bigger the movement of the left controller 3 is determined to be), the better the evaluation is, the details of which will be described later.

Also, during the dance period, the information processing system 1 outputs a sound representing the rhythm. That is, at each point in time the left controller 3 is vibrated, the information processing system 1 outputs a sound representing the point in time. For example, a sound effect may be output to the rhythm. For example, a BGM may be output such that a sound is output to the rhythm (in other words, the timing of vibrations of the controller may be set so that the controller vibrates to the rhythm of the BGM).

As shown in FIG. 12, when the dance period ends, the pose period starts. In the exemplary embodiment, the pose period starts following the dance period (i.e., the pose period starts immediately after the end of the dance period; see FIG. 12).

During the pose period, as shown in FIG. 12, the player stops the operation by remaining still. During the pose period, the information processing system 1 determines whether or not the player (in other words, the left controller 3) is remaining still. While the player is determined to be remaining still, the information processing system 1 vibrates the left controller 3 and the information processing system 1 outputs a predetermined sound effect. On the other hand, when the player is not determined to be remaining still, the information processing system 1 does not vibrate the left controller 3 and the information processing system 1 does not output the predetermined sound effect. Therefore, the player can recognize whether or not the player is remaining still based on the vibration of the left controller 3 held in hand. Thus, the player can hold the operation (in other words, hold still) without looking at the game image displayed on the display 12 of the main body apparatus 2.

Note that in the exemplary embodiment, the dance period and the pose period each have a predetermined length. Note however that in other embodiments, the length of the dance period and/or the length of the pose period may be variable (e.g., at random). Then, it becomes more difficult for the player to predict the start of the pose period, thereby enhancing the playability of the game. In other embodiments, the dance period and the pose period may be repeated for a plurality of (e.g., three) iterations.

The vibration of the left controller 3 during the dance period and that during the pose period are different from each other in terms of the pattern of vibration (in other words, the condition of vibration). In other embodiments, they may be different from each other in terms also of the magnitude and/or the frequency of vibration, etc. Thus, the player is allowed to recognize the two different vibrations in an easy-to-understand manner.

In the exemplary embodiment, the information processing system 1 evaluates the game operation performed by the player after the end of the operation (i.e., after the end of the pose period). In second game example, the information processing system 1 evaluates the following evaluation criteria:

First evaluation criterion: Is the player dancing to the rhythm during the dance period?
Second evaluation criterion: Is the player dancing vigorously during the dance period?
Third evaluation criterion: Is the player remaining still during the pose period?

The evaluation for the first evaluation criterion (i.e., is the player dancing to the rhythm?) is based on the magnitude of the motion of the left controller 3 at points in time the left controller 3 is vibrated (i.e., beats of the rhythm). More specifically, when the acceleration sensed by the acceleration sensor 104 at the time of vibration (that is, a point in time the left controller 3 is vibrated) is greater than or equal to a predetermined value, the information processing system 1 determines that the controller is moving to the rhythm.

Therefore, in the second game example, a good evaluation is achieved when an operation in which the acceleration is greater than or equal to a predetermined value is timed with the rhythm, and a poor evaluation is achieved when the operation is not timed with the rhythm.

As described above, in the second game example, the information processing system 1 vibrates the controller to a predetermined rhythm (specifically, the information processing system 1 vibrates the controller at points in time in sync with the predetermined rhythm). Then, the information processing system 1 evaluates the game operation based on the difference between the predetermined rhythm and the rhythm to which predetermined operations (i.e., operations such that the acceleration is greater than or equal to a predetermined value) are performed using the controller. In other words, the information processing system 1 evaluates the game operation based on the difference between the beats of a predetermined pattern (in other words, the beats of the predetermined rhythm) and the points in time at which predetermined operations are performed using the operation section. More specifically, the information processing system 1 gives a better evaluation to the game operation when the points in time at which the controller vibrates are closer to the points in time at which predetermined operations are performed using the controller, as compared with cases where these points in time are farther away from each other.

The evaluation for the second evaluation criterion (i.e., is the player dancing vigorously?) is based on the magnitude of the motion of the left controller 3 at points in time other than the points in time at which the left controller 3 vibrates. More specifically, the information processing system 1 evaluates the degree of vigorousness of the motion based on the acceleration sensed by the acceleration sensor 104 at the non-vibrating points in time. The degree of vigorousness of the motion may be calculated for example as a cumulative acceleration value or as a value that is determined based on the number of times the acceleration is greater than or equal to a predetermined value.

As described above, in the second game example, the information processing system 1 evaluates the game operation based on operations performed using the controller at points in time (i.e., points in time that are determined in accordance with the predetermined rhythm) or a period (i.e., the dance period) based on the points in time at which the controller vibrates. The information processing system 1 evaluates the game operation based on the magnitude of the motion of the controller that is identified based on the output of the inertia sensor during a period (i.e., the dance period) that is determined based on the points in time at which the controller vibrates (the first and second evaluation criteria).

Note that the magnitude of the motion of the controller represents the amount of change in the position and/or the orientation of the controller. There is no particular limitation on the method for calculating the magnitude of the motion, and the magnitude of the motion may be calculated based on the sensing result of the angular velocity sensor in addition to (or instead of) the acceleration sensor, for example.

The evaluation for the third evaluation criterion (i.e., is the player remaining still?) is based on the motion of the left controller 3. More specifically, the information processing system 1 determines whether or not the sum between the acceleration sensed by the acceleration sensor 104 and the angular velocity sensed by the angular velocity sensor 105 is less than or equal to a predetermined value. Then, the information processing system 1 determines that the player remains still if the sum is less than or equal to the predetermined value, and that the player does not remain still if the sum is greater than the predetermined value. Note that this determination is made repeatedly at a rate of once per a predetermined period of time during the pose period. Note that there is no particular limitation on the method for determining whether or not the player remains still, and it may be done in other embodiments based on the sensing result of only one of the acceleration sensor and the angular velocity sensor, for example.

The evaluation result may be presented to the player in any form, e.g., as a score. That is, the information processing system 1 calculates the score for each of the evaluation criteria described above so that the score is higher when the evaluation is better. Then, the calculated scores are displayed on the display 12 of the main body apparatus 2.

As described above, in the second game example, the player can know, by way of vibrations of the controller held by the player, the rhythm to which operations should be performed (i.e., the predetermined rhythm during the dance period). Therefore, in the second game example, the player can perform operations without looking at the screen on which the game image is displayed, and the player can easily perform operations while freely moving around. For example, the player can dance vigorously without looking at the screen during the dance period, and can strike a pose without looking at the screen during the pose period, thus making it easier to perform operations.

(Specific Game Process Example of Second Game Example)

Figure 13:
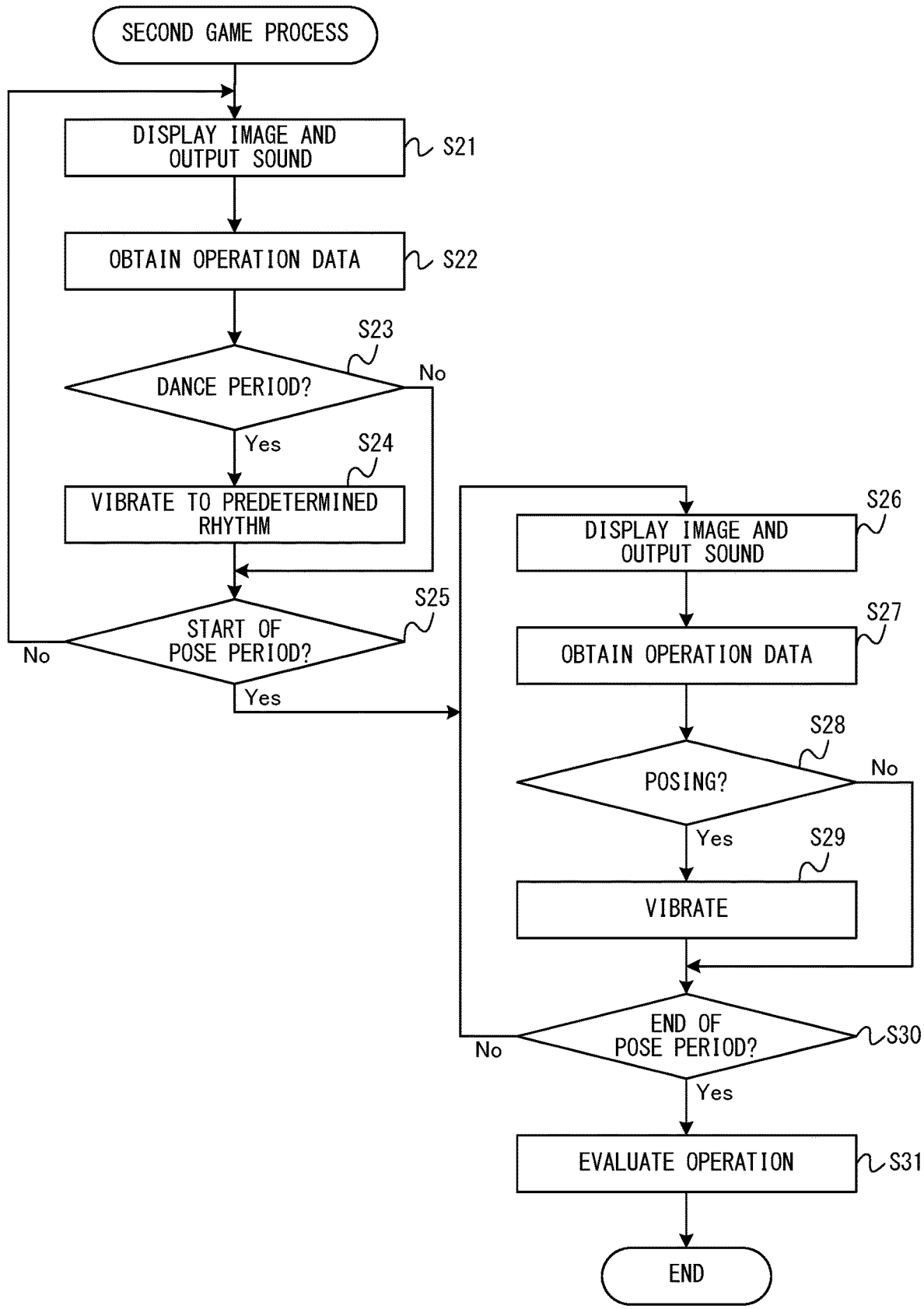
FIG. 13 is a flow chart showing an example flow of a game process of the second game example to be executed on an example of the information processing system.

FIG. 13 is a flow chart showing an example flow of a game process of the second game example (referred to as the "second game process") to be executed on the information processing system. Note that in the exemplary embodiment, the game program stored in a storage section that can be accessed by the information processing system 1 includes a program of the second game process. The series of processes shown in FIG. 13 is started as the CPU 81 of the main body apparatus 2 executes the program of the second game process.

In step S21, the CPU 81 displays a game image on the display 12 and outputs a game sound such as a BGM or a sound effect from the speakers 88. In the exemplary embodiment, before the end of the dance period, the process of step S1 is executed at a rate of once per a predetermined period of time (i.e., one frame period), thereby outputting a moving image of the game image and a game sound. The process of step S22 is executed, following step S21.

In step S22, the CPU 81 obtains operation data from the left controller 3. The process of step S22 is similar to the process of step S2 of the first game process. The process of step S23 is executed, following step S22.

In step S23, the CPU 81 determines whether or not it is during the dance period. That is, the CPU 81 determines whether or not the current point in time is after the start of the dance period and before the end of the dance period. Note that in the exemplary embodiment, the start and the end of the dance period and the pose period are predetermined in the game program described above. When the determination result of step S23 is affirmative, the process of step S24 is executed. On the other hand, when the determination result of step S23 is negative, the process of step S25 to be described later is executed, skipping the process of step S24.

In step S24, the CPU 81 vibrates the left controller 3 to a predetermined rhythm. That is, the CPU 81 vibrates the left controller 3 when the current point in time coincides with a beat of the predetermined rhythm, and does not vibrate the left controller 3 otherwise. In the exemplary embodiment, since the series of processes of steps S21 to S25 is executed repeatedly at a rate of once per a predetermined period of time, and the left controller 3 is vibrated to the beats of the predetermined rhythm by the process of step S24. Note that the specific process operation for vibrating the left controller 3 in step S24 is the same as the process operation in step S4 described above. The process of step S25 is executed, following step S24.

In step S25, the CPU 81 determines whether or not the pose period is to start (in other words, whether or not the dance period is to end). That is, the CPU 81 determines whether or not a predetermined point in time that is at the start of the pose period has come. When the determination result of step S25 is affirmative, the process of step S26 is executed. On the other hand, when the determination result of step S25 is negative, the process of step S21 is executed again.

In step S26, the CPU 81 displays a game image on the display 12 and outputs a game sound such as a BGM or a sound effect from the speakers 88. The process of step S26 is similar to the process of step S21 described above. In the exemplary embodiment, during the pose period after the end of the dance period, the process of step S26 is executed at a rate of once per a predetermined period of time (i.e., one frame period), thereby outputting a moving image of the game image and a game sound. The process of step S27 is executed, following step S26.

In step S27, the CPU 81 obtains operation data from the left controller 3. The process of step S27 is similar to the process of step S22 described above. The process of step S28 is executed, following step S27.

In step S28, the CPU 81 determines whether or not the left controller 3 (in other words, the player) is remaining still. This determination is made by the determination method described in "(Outline of second game example)" above. Specifically, the CPU 81 reads out, from the DRAM 85, data of the sensing results of the acceleration sensor 104 and the angular velocity sensor 105 that are included in the latest operation data obtained in step S27, and makes the determination based on the read-out data. When the determination result of step S28 is affirmative, the process of step S29 is executed. On the other hand, when the determination result of step S28 is negative, the process of step S30 is executed, skipping the process of step S29.

In step S29, the CPU 81 vibrates the left controller 3. Note that the specific process operation for vibrating the left controller 3 in step S29 is the same as the process operation in step S4 described above. Note that in step S29, the CPU 81 may transmit, to the left controller 3, a command for vibrating the left controller 3 over a period of time that is longer than the time interval between executions of the process of step S29 (i.e., the predetermined period of time). Then, even when the determination result of step S28 is affirmative successively, the vibration of the left controller 3 is produced continuously without disruption. The process of step S30 is executed, following step S29.

In step S30, the CPU 81 determines whether or not the pose period is to end. That is, the CPU 81 determines whether or not a predetermined point in time that is at the end of the pose period has come. When the determination result of step S30 is affirmative, the process of step S31 is executed. On the other hand, when the determination result of step S30 is negative, the process of step S26 is executed again.

In step S31, the CPU 81 evaluates the game operation performed by the player. That is, the CPU 81 reads out operation data stored in the DRAM 85 to evaluate the game operation based on the read-out operation data. Note that the specific evaluation process is performed by the method described in "(Outline of second game example)" above. Of the evaluations made in the second game example, the evaluation as to whether the player is remaining still may be made by using the determination result of step S28 described above.

In step S31, the CPU 81 notifies the player of the evaluation result. That is, the CPU 81 generates a game image representing the evaluation result (e.g., a game image representing a score), and displays the game image on the display 12. After step S31, the CPU 81 ends the second game process shown in FIG. 13.

3-3: Third Game Example

Figure 14:
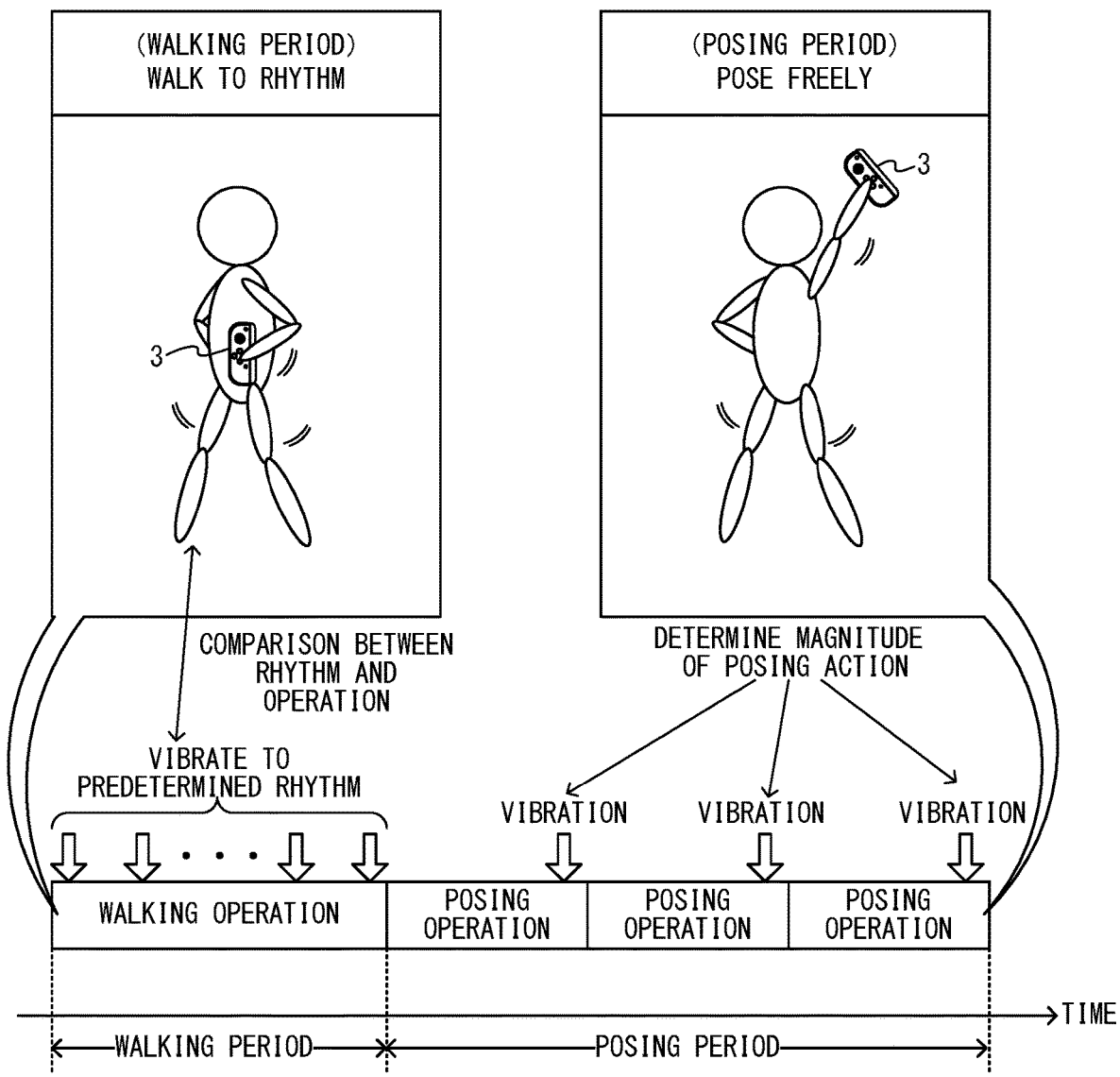
FIG. 14 is a diagram showing an outline of a third game example.

A third game example will be described with reference to FIG. 14 and FIG. 15. FIG. 14 is a diagram showing an outline of the third game example. The third game example is a single-player game, in which the player performs an action (in other words, operation) of walking during a predetermined walking period, and an action of striking a pose during a predetermined posing period. In the third game example, the game operation is evaluated based for example on whether the player is walking to the rhythm during the walking period and striking a pose with a big move during the posing period. Note that since the player uses one controller in the third game example, a plurality of players can play the game simultaneously by using a plurality of controllers.

(Outline of Third Game Example)

As shown in FIG. 14, in the third game example, after the game starts, the walking period comes. Here, after the start of the game, the information processing system 1 outputs a game sound such as a BGM or a sound effect, for example, from the speakers 88. The game sound may be a sound that is capable of allowing the player to recognize the upcoming walking period.

As shown in FIG. 14, during the walking period, the player holds a controller (herein, the left controller 3) in one hand, and performs a walking operation by walking while the hand holding the controller is placed on the hip. Note that as the player walks while the hand holding the controller is placed on the hip, the motion of the left controller 3 can be regarded as the motion of the hip of the player, making it possible to sense the motion of the hip of the player. Note that while the player is allowed to walk in any manner, the player achieves a better evaluation by shaking the hip harder in the third game example.

During the walking period, the information processing system 1 vibrates the left controller 3 held by the player to a predetermined rhythm (or a "predetermined pattern") (see FIG. 14). The rhythm is a succession of vibrations with regular intervals. The player walks to the rhythm of the vibration of the left controller 3. That is, the player walks to a rhythm such that the player takes one step for each vibration. Since the player can recognize the rhythm by way of vibrations of the left controller 3, the player can walk freely without looking at the game image displayed on the display 12 of the main body apparatus 2. For example, the player can move to a place away from the main body apparatus 2.

During the walking period, the information processing system 1 outputs a sound representing the rhythm. That is, at a point in time at which the left controller 3 vibrates, the information processing system 1 outputs a sound representing the point in time. For example, a sound effect may be output to the rhythm. For example, a BGM may be output such that a sound is output to the rhythm.

In the exemplary embodiment, the walking period has a predetermined length. For example, the length of the walking period is such that the player can take a predetermined number of (e.g., eight) steps (i.e., the left controller 3 vibrates eight times). As shown in FIG. 14, when the walking period ends, the posing period starts. In the exemplary embodiment, the posing period starts following the walking period. Note however that in other embodiments, there may be a gap between the walking period and the posing period.

During the posing period, as shown in FIG. 14, the player performs a posing operation by striking a pose at a predetermined point in time ("pose time"). That is, the player freely strikes a pose with the left controller 3 held in one hand. In the exemplary embodiment, the pose time comes a plurality of times (herein, three times) with regular intervals therebetween in a posing period. Therefore, the player strikes a pose three times in a posing period. Note that in the third game example, the player achieves a better evaluation by striking a pose with a big move, the details of which will be described later.

During the posing period, the information processing system 1 vibrates the left controller 3 held by the player at each pose time (see FIG. 14). Therefore, the player can recognize when to strike a pose by way of vibrations of the left controller 3, and the player can freely perform the posing operation without looking at the game image displayed on the display 12 of the main body apparatus 2.

The manner of vibration may be the same or different between the vibration of the left controller 3 during the walking period and that during the posing period. By varying the manner of vibration between the two vibrations described above, it is possible to allow the player to recognize the walking period and the posing period in an easier-to-understand manner.

During the posing period, at each point in time the left controller 3 is vibrated, the information processing system 1 outputs a sound representing the point in time. For example, a sound effect may be output at each point in time the left controller 3 is vibrated. For example, a BGM may be output such that a sound is output at each point in time the left controller 3 is vibrated.

In the exemplary embodiment, the information processing system 1 evaluates the game operation performed by the player after the end of the operation (i.e., after the end of the posing period). In the third game example, the information processing system 1 evaluates the following evaluation criteria:

First evaluation criterion: Is the player walking to the rhythm?

Second evaluation criterion: Is the player walking while shaking hip hard?

Third evaluation criterion: Is the player striking a pose with a big move?

The evaluation for the first evaluation criterion (i.e., is the player walking to the rhythm?) is based on the motion of the left controller 3 during a period of time that is identified by each point in time the left controller 3 is vibrated (i.e., each beat of the rhythm). In the exemplary embodiment, a time slot of a predetermined length is defined for each point in time of vibration during the walking period. Specifically, the time slot is a slot having a predetermined length along time axis that is centered about a point in time at which the controller is vibrated. Each time slot may be continuous with or spaced apart from the following time slot. The information processing system 1 determines whether or not the waveform of the angular velocity sensed by the angular velocity sensor 105 of the left controller 3 has a peak within the time slot. It is determined that the player is walking for a time slot when a peak is present within the time slot, and it is determined that the player is not walking for a time slot when no peak is present within the time slot. The determination is made for each time slot. The information processing system 1 makes an evaluation as to whether the player is walking to the rhythm based on the number of time slots for which the player has determined to be walking.

For example, when the player is walking to the rhythm, a peak is present for many time slots, and there are a larger number of time slots for which the player is determined to be walking. In such a case, the evaluation result will be good. On the other hand, when the player is not walking to the rhythm, a peak is not present for many time slots, and there are a smaller number of time slots for which the player is determined to be walking. In such a case, the evaluation result will be poor.

As described above, in the third game example, the information processing system 1 vibrates the controller to a predetermined rhythm. Then, the information processing system 1 evaluates the game operation based on the difference between the predetermined rhythm and the rhythm to which predetermined operations (i.e., operations such that there is a peak of the angular velocity) are performed using the controller (in other words, the timing of the predetermined operations).

The evaluation for the second evaluation criterion (i.e., is the player walking while shaking hip hard?) is based on the motion of the left controller 3 during each period of time that is identified by a point in time at which the left controller 3 vibrates. Specifically, the larger the peak of the waveform of the angular velocity is within a time slot, the harder the player is determined to be shaking hip while walking, resulting in a better evaluation result. Note that for the peak that is used for evaluation, it is assumed that there is only one peak within each time slot. That is, when there are a plurality of peaks within a time slot, the magnitude of only one of the peaks is determined.

Note that in the exemplary embodiment, for the evaluation of the walking operation, the information processing system 1 uses angular velocities of the left controller 3 along two predetermined axes thereof (e.g., an axis in the front-rear direction of the left controller 3 and an axis in the longitudinal direction). This is for sensing the motion of the hip of the player with respect to the horizontal direction (in other words, the rotational motion about an axis in the vertical direction) and the motion of the hip of the player with respect to the up-down direction (in other words, the rotation motion of the player about an axis along the front-rear direction). Note however that in other embodiments, the information processing system 1 may use an angular velocity with respect to one predetermined axial direction so as to calculate the motion of the hip of the player for only one of the horizontal direction and the up-down direction, or may use angular velocities with respect to three axial directions so as to calculate the motion of the hip of the player for three axial directions. The evaluation for the walking operation may be made based on the sensing result of the acceleration sensor in addition to (or instead of) the sensing result of the angular velocity sensor.

The evaluation for the third evaluation criterion (i.e., is the player striking a pose with a big move?) is based on the motion of the left controller 3 during a period of time that is identified by a point in time at which the left controller 3 vibrates (i.e., the pose time). In the exemplary embodiment, time slots having a predetermined length are defined in the posing period, wherein each time slot is defined based on the point in time of vibration. Specifically, the time slot is a slot that starts a predetermined period of time before a point in time of vibration and that includes the point in time of vibration within the slot. Note that the information processing system 1 may output a sound representing the start of a predetermined slot (e.g., a voice "pose"). Each time slot may be continuous with or spaced apart from the following time slot.

The information processing system 1 evaluates the game operation based on the magnitude of the motion of the left controller 3 within each time slot. Specifically, the information processing system 1 identifies, within the time slot, the first point in time at which the left controller 3 starts moving and the second point in time at which the left controller 3 stops moving. These points in time can be identified based on the acceleration sensed by the acceleration sensor 104 of the left controller 3 and/or the angular velocity sensed by the angular velocity sensor 105 of the left controller 3. For example, the points in time described above can be identified by a method similar to the method of determination used in the pose period of the second game example described above (i.e., determining whether or not the player is remaining still).

The information processing system 1 evaluates the game operation based on the cumulative acceleration value for the slot between the first point in time and the second point in time and the cumulative angular velocity value for the slot. The larger these cumulative values are, the harder the player is determined by the information processing system 1 to be moving while striking a pose, resulting in a better evaluation result.

With the above evaluation of the posing operation, when the point in time of posing is off the point in time of vibration (i.e., the pose time), for example, it is determined that the player is not striking a pose with a big move, and the evaluation tends to be poor as compared with a case where the time of posing coincides with the time of vibration. Therefore, in the third game example, the information processing system 1 evaluates the game operation based on the difference between each beat of predetermined pattern (i.e., the pose time) and a point in time at which a predetermined operation (i.e., the operation of striking a pose) is performed using the controller.

As described above, in the third game example, the information processing system 1 evaluates the game operation based on operations performed using the controller at points in time that are based on the points in time at which the controller vibrates (i.e., the beats of the predetermined rhythm during the walking period) or during a period of time that is determined based on the points in time at which the controller vibrates (i.e., a time slot during the walking period or the posing period). The information processing system 1 evaluates the game operation based on the magnitude of the motion of the controller that is identified based on the output of the inertia sensor during a period of time that is determined based on the points in time at which the controller vibrates (i.e., a time slot during the walking period or the posing period) (the first to third evaluation criteria described above).

The evaluation result may be presented to the player in any form, e.g., as a score. That is, the information processing system 1 calculates the score for each of the first to third evaluation criteria described above so that the score is higher when the evaluation is better. Then, the calculated scores are displayed on the display 12 of the main body apparatus 2.

As described above, in the third game example, the player can know, by way of vibrations of the controller held by the player, the rhythm to which operations should be performed (i.e., the predetermined rhythm during the walking period) and the points in time at which operations should be performed (i.e., the pose time during the posing period). Therefore, in the third game example, the player can perform operations without looking at the screen on which the game image is displayed, and the players can easily perform operations while freely moving around. For example, the player can walk to a position at which the player cannot look at the screen during the walking period, or can strike a pose such that the player does not look at the screen during the posing period, thereby allowing for freer operations.

(Specific Game Process Example of Third Game Example)

Figure 15:
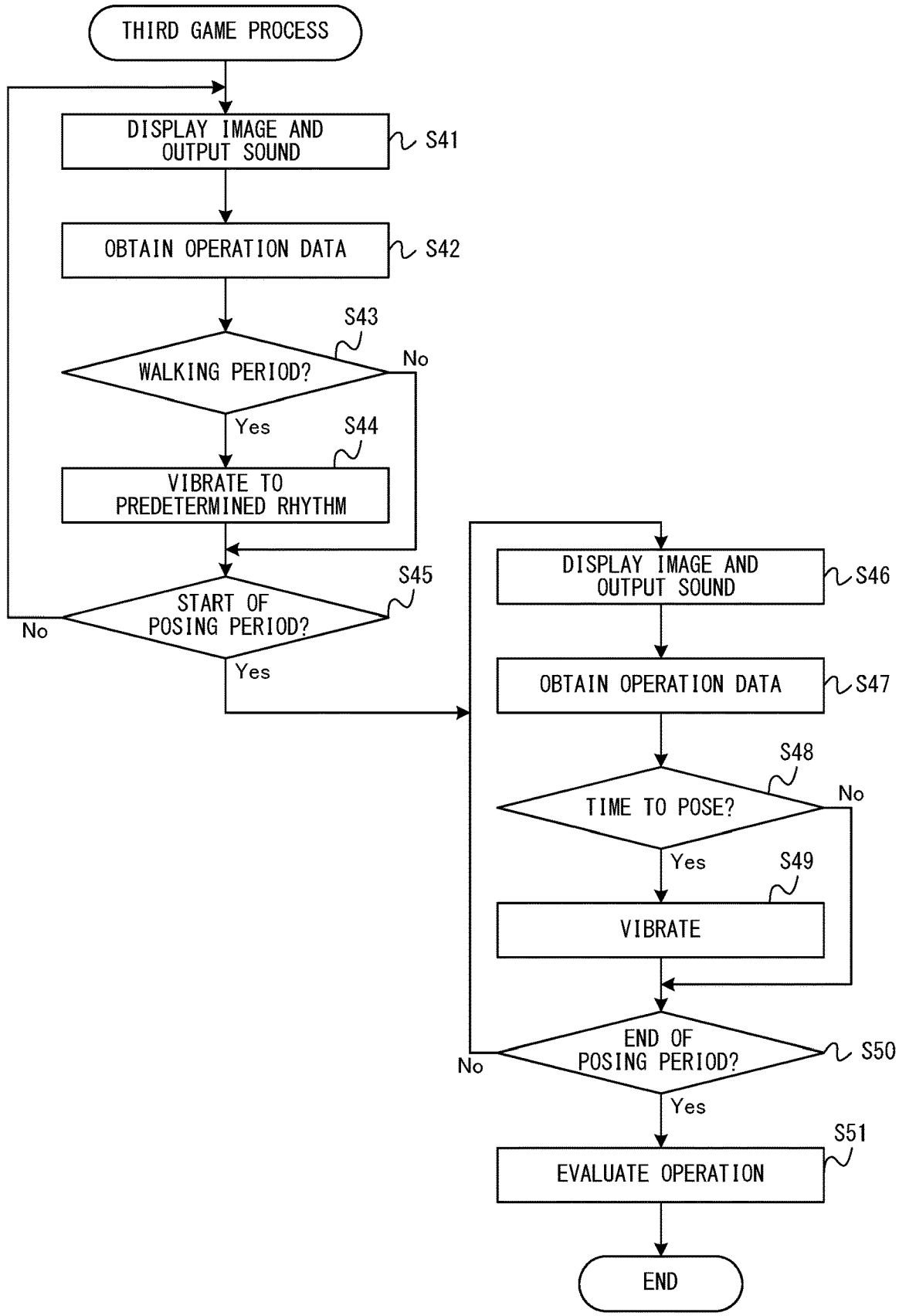
FIG. 15 is a flow chart showing an example flow of a game process of the third game example to be executed on an example of the information processing system.

FIG. 15 is a flow chart showing an example flow of a game process of the third game example (referred to as the "third game process") to be executed on the information processing system. Note that in the exemplary embodiment, the game program stored in a storage section that can be accessed by the information processing system 1 includes a program of the third game process. The series of processes shown in FIG. 15 is started as the CPU 81 of the main body apparatus 2 executes the program of the third game process.

In step S41, the CPU 81 displays a game image on the display 12 and outputs a game sound such as a BGM or a sound effect from the speakers 88. In the exemplary embodiment, before the end of the walking period, the process of step S41 is executed at a rate of once per a predetermined period of time (i.e., one frame period), thereby outputting a moving image of the game image and a game sound. The process of step S42 is executed, following step S41.

In step S42, the CPU 81 obtains operation data from the left controller 3. The process of step S42 is similar to the process of step S22 of the second game process. The process of step S43 is executed, following step S42.

In step S43, the CPU 81 determines whether or not it is during the walking period. That is, the CPU 81 determines whether or not the current point in time is after the start of the walking period and before the end of the walking period. Note that in the exemplary embodiment, the start and the end of the walking period and the posing period are predetermined in the game program described above. When the determination result of step S43 is affirmative, the process of step S44 is executed. On the other hand, when the determination result of step S43 is negative, the process of step S45 to be described later is executed, skipping the process of step S44.

In step S44, the CPU 81 vibrates the left controller 3 to a predetermined rhythm. The process of step S44 is similar to the process of step S24 of the second game process. The process of step S45 is executed, following step S44.

In step S45, the CPU 81 determines whether the posing period is to start (in other words, whether the walking period is to end). That is, the CPU 81 determines whether or not a predetermined point in time that is at the start of the posing period has come. When the determination result of step S45 is affirmative, the process of step S46 is executed. On the other hand, when the determination result of step S45 is negative, the process of step S41 is executed again.

In step S46, the CPU 81 displays a game image on the display 12 and outputs a game sound such as a BGM or a sound effect from the speakers 88. The process of step S46 is similar to the process of step S41. In the exemplary embodiment, in the posing period after the end of the walking period, the process of step S46 is executed at a rate of once per a predetermined period of time (i.e., one frame period), thereby outputting a moving image of the game image and a game sound. The process of step S47 is executed, following step S46.

In step S47, the CPU 81 obtains operation data from the left controller 3. The process of step S47 is similar to the process of step S42. The process of step S48 is executed, following step S47.

In step S48, the CPU 81 determines whether or not the pose time has come. Note that in the exemplary embodiment, it is assumed that the pose time is predetermined in the game program. When the determination result of step S48 is affirmative, the process of step S49 is executed. On the other hand, when the determination result of step S48 is negative, the process of step S50 is executed, skipping the process of step S49.

In step S49, the CPU 81 vibrates the left controller 3. The process of step S49 is similar to the process of step S4 of the first game process. The process of step S50 is executed, following step S49.

In step S50, the CPU 81 determines whether or not to end the posing period. That is, the CPU 81 determines whether or not a predetermined point in time that is at the end of the posing period has come. When the determination result of step S50 is affirmative, the process of step S51 is executed. On the other hand, when the determination result of step S50 is negative, the process of step SM is executed again.

In step S51, the CPU 81 evaluates the game operation performed by the player. That is, the CPU 81 reads out operation data stored in the DRAM 85 to evaluate the game operation based on the read-out operation data. Note that the specific evaluation process is performed by the method described in "(Outline of third game example)" above. In step S51, the CPU 81 notifies the player of the evaluation result. That is, the CPU 81 generates a game image representing the evaluation result (e.g., a game image representing a score), and displays the game image on the display 12. After step S51, the CPU 81 ends the third game process shown in FIG. 15.

3-4: Fourth Game Example

Figure 16:
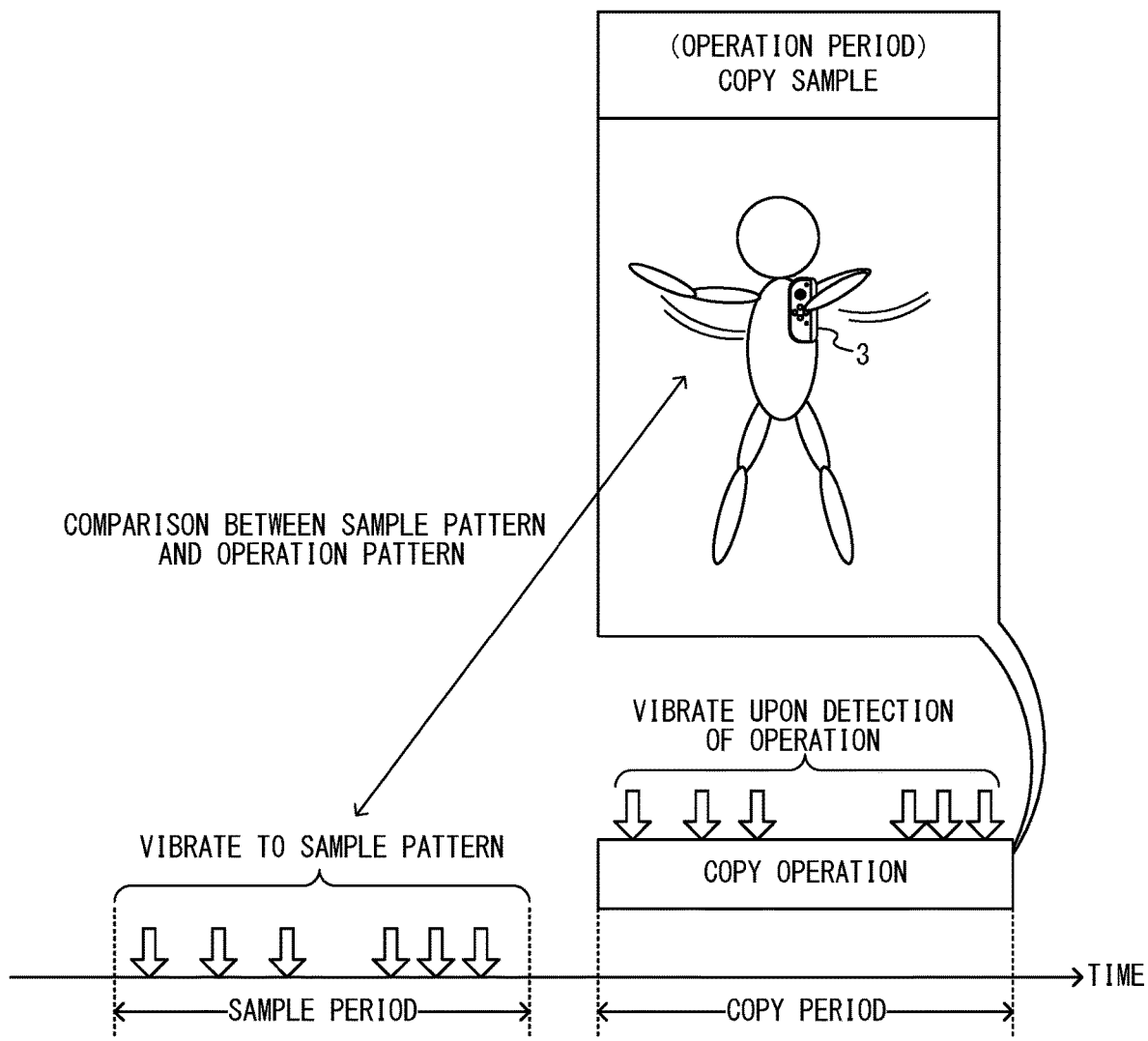
FIG. 16 is a diagram showing an outline of a fourth game example.

A fourth game example will be described with reference to FIG. 16 and FIG. 17. FIG. 16 is a diagram showing an outline of the fourth game example. The fourth game example is a single-player game, in which the player performs a predetermined action (in other words, operation) of copying a sample by making inputs of the same pattern as the sample pattern, which is presented before the player performs the predetermined operation. For example, in a game in which the player copies gorilla's drumming, the player extends one arm while bending the other arm in front of the chest. In the fourth game example, the game operation is evaluated based on, for example, whether the player made operation inputs to the beats of the sample pattern. Note that since the player uses one controller in the fourth game example, a plurality of players can play the game simultaneously by using a plurality of controllers.

(Outline of Fourth Game Example)

As shown in FIG. 16, in the fourth game example, the sample period comes after the start of the game. In the sample period, the information processing system 1 vibrates the controller held by the player (herein, the left controller 3) to a predetermined pattern (in other words, a predetermined rhythm) (see FIG. 16). Hereinafter, the pattern presented in the sample period will be referred to as the "sample pattern".

During the sample period, the information processing system 1 outputs a sound that represents the sample pattern (in other words, a sound that represents each point in time the left controller 3 is vibrated). For example, a sound effect (e.g., barks of a gorilla) may be output to the sample pattern. For example, a BGM may be output such that a sound is output to the beats of the sample pattern. Note that an image representing the sample pattern may be displayed on the display 12, or another game image may be displayed thereon without displaying an image representing the sample pattern.

Note that during the sample period, the player does not perform an operation but looks at and memorizes the sample pattern.

As shown in FIG. 16, the copy period is started after the end of the sample period. In the exemplary embodiment, the copy period starts after the elapse of a predetermined period of time since the end of the sample period. The information processing system 1 may output a game sound (e.g., a BGM or a sound effect) from the speakers 88, with which the player can recognize the copy period to come. The same game sound as that during the sample period may be output during the copy period so that the player can somewhat guess the beats of the sample pattern.

During the copy period, the player performs a copy operation so as to produce the same pattern as the sample pattern. Here, a single iteration of the copy operation is performed by extending one arm while bending the other arm in front of the chest (see FIG. 16). The following copy operation is performed by extending the arm that has been bent while bending the other arm that has been extended in front of the chest.

During the copy period, upon detection of the copy operation, the information processing system 1 vibrates the left controller 3 (see FIG. 16). Therefore, the player can recognize the point in time the copy operation is detected by way of vibrations of the left controller 3. A sound effect may also be output at this point in time.

Note that during the copy period, the information processing system 1 may vibrate the left controller 3 to the beats of the sample pattern. The manner of vibration may be the same or different between the vibration of the left controller 3 during the sample period and the vibration of the left controller 3 during the copy period. By varying the manner of vibration between the two vibrations described above, it is possible to allow the player to recognize the sample period and the copy period in an easier-to-understand manner.

During the copy period, the information processing system 1 may vibrate the left controller 3 both at the beats of the sample pattern and at the points in time at which the copy operation is detected. When a beat of the sample pattern coincides with the detection of a copy operation, the manner of vibration may be varied (e.g., a higher intensity of vibration) as compared with a case where a beat of the sample pattern does not coincide with the detection of a copy operation. Then, the player can recognize that the player has successfully performed an operation to the beats of the sample pattern by way of vibrations (specifically, the controller is vibrated in sync with the beats of the sample pattern).

In the exemplary embodiment, after the end of the operation (i.e., after the end of the copy period), the information processing system 1 evaluates the game operation performed by the player. In the fourth game example, the information processing system 1 evaluates the following evaluation criteria:

First evaluation criterion: Is the player performing copy operations to the beats of the sample pattern?

Second evaluation criterion: Is the player performing copy operations with big moves?

The evaluation for the first evaluation criterion (i.e., is the player performing copy operations to the beats of the sample pattern?) is based on a comparison between the beats of the sample pattern and the points in time at which copy operations are performed. For example, the information processing system 1 determines that the copy operation is performed to the beats of the sample pattern when the difference between a beat of the sample pattern and a point in time at which the copy operation is performed is less than or equal to a predetermined period of time. Then, the information processing system 1 evaluates the game operation based on the number of copy operations that are performed to the beats of the sample pattern. Alternatively, for example, the information processing system 1 may give a better evaluation as the difference between the beats of the sample pattern and the points in time at which copy operations are performed is smaller.

Note that a copy operation is detected in response to the rotation of the left controller 3 in a predetermined rotation direction by a predetermined angle. For example, assuming that the left controller 3 is held so that the longitudinal direction thereof is along the vertical direction, the information processing system 1 determines that a copy operation is performed upon detecting that the left controller 3 has rotated by a predetermined angle (e.g., 20°) in the rotation direction about an axis along the longitudinal direction. The information processing system 1 determines that the next copy operation is performed upon detecting that the left controller 3 has rotated by a predetermined angle in the opposite direction to the rotation direction of the preceding copy operation. Note that the rotation of the controller can be calculated based on the sensing result of the angular velocity sensor.

As described above, in the fourth game example, the information processing system 1 vibrates the controller to the beats of the predetermined pattern (in other words, rhythm). The information processing system 1 evaluates the game operation based on the difference between the predetermined pattern and the rhythm to which predetermined operations (i.e., copy operations) have been performed using the controller. In other words, the information processing system 1 evaluates the game operation based on a comparison between the pattern to which the controller vibrates and the pattern to which predetermined operations have been performed. The information processing system 1 evaluates the game operation based on the difference between the beats of the predetermined pattern and the points in time at which predetermined operations have been performed using the controller.

In the fourth game example, the controller produces vibrations to a predetermined pattern prior to the predetermined operation period (i.e., the copy period) (see FIG. 16). The information processing system 1 evaluates the game operation based on a comparison between the predetermined pattern and the points in time at which operations (specifically, copy operations) have been performed using the controller during the predetermined operation period.

The evaluation for the second evaluation criterion (i.e., is the player performing copy operations with big moves?) is based on the magnitude of the motion of each detected copy operation. Specifically, when a copy operation is detected, the information processing system 1 calculates the rotation angle of the left controller 3 of the copy operation. For example, when the left controller 3 rotates by the predetermined angle (e.g., 20°) and then further rotates by 30°, the rotation angle of the left controller 3 of the copy operation is 50°. The greater the rotation angle is, the harder the player is determined by the information processing system 1 to be performing the copy operation, resulting in a better evaluation.

In the fourth game example, the copy operation is detected based on the sensing result of the angular velocity sensor, and the copy operation is evaluated based on the sensing result of the angular velocity sensor. Here, there is no particular limitation on the method for detecting the copy operation and the method for evaluating the copy operation. For example, in other embodiments, the copy operation may be detected and/or evaluated based on the sensing result of the acceleration sensor in addition to (or instead of) the angular velocity sensor.

The evaluation result may be presented to the player in any form, e.g., as a score. That is, the information processing system 1 calculates the score for each of the evaluation criteria described above so that the score is higher when the evaluation is better. Then, the calculated scores are displayed on the display 12 of the main body apparatus 2.

As described above, in the fourth game example, the player can know the timing with which operations are supposed to be performed (in other words, the sample pattern) by way of vibrations of the controller held by the player. Therefore, in the fourth game example, the player can recognize the sample pattern without looking at the screen on which the game image is displayed, and the player can easily perform operations while freely moving around. For example, the player can perform operations facing toward another player (when the game is played by a plurality of players), and the player can enjoy the game by performing operations more freely.

(Specific Game Process Example of Fourth Game Example)

Figure 17:
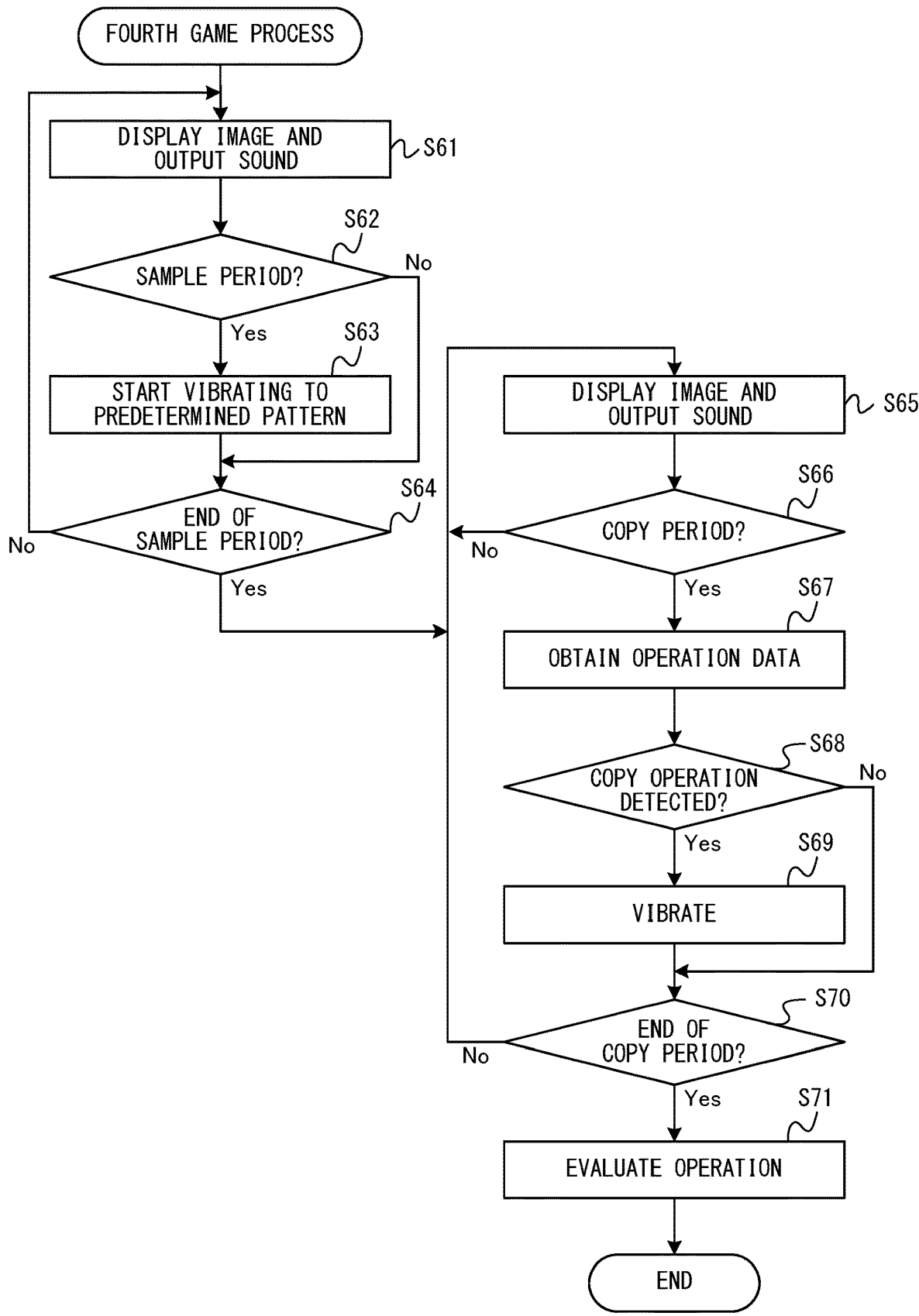
FIG. 17 is a flow chart showing an example flow of a game process of the fourth game example to be executed on an example of the information processing system.

FIG. 17 is a flow chart showing an example flow of a game process of the fourth game example (referred to as the "fourth game process") to be executed on the information processing system. Note that in the exemplary embodiment, the game program stored in a storage section that can be accessed by the information processing system 1 includes a program of the fourth game process. The series of processes shown in FIG. 17 is started as the CPU 81 of the main body apparatus 2 executes the program of the fourth game process.

In step S61, the CPU 81 displays a game image on the display 12 and outputs a game sound such as a BGM or a sound effect from the speakers 88. In the exemplary embodiment, before the end of the sample period, the process of step S61 is executed at a rate of once per a predetermined period of time (i.e., one frame period), thereby outputting a moving image of the game image and a game sound. The process of step S62 is executed, following step S61.

In step S62, the CPU 81 determines whether or not it is during the sample period. That is, the CPU 81 determines whether or not the current point in time is after the start of the sample period and before the end of the sample period. Note that in the exemplary embodiment, the start and the end of the sample period and the copy period are predetermined in the game program described above. When the determination result of step S62 is affirmative, the process of step S63 is executed. On the other hand, when the determination result of step S62 is negative, the process of step S64 to be described later is executed, skipping the process of step S63.

In step S63, the CPU 81 vibrates the left controller 3 to a predetermined pattern. That is, the CPU 81 vibrates the left controller 3 when the current point in time coincides with a beat of the predetermined pattern, and does not vibrate the left controller 3 otherwise. In the exemplary embodiment, since the series of processes of steps S61 to S64 is executed repeatedly at a rate of once per a predetermined period of time, and the left controller 3 is vibrated to the beats of the predetermined pattern by the process of step S63. Note that the specific process operation for vibrating the left controller 3 in step S63 is the same as the process operation in step S4 described above. The process of step S64 is executed, following step S63.

In step S64, the CPU 81 determines whether or not the sample period is to end. That is, the CPU 81 determines whether or not a predetermined point in time that is at the end of the sample period has come. When the determination result of step S64 is affirmative, the process of step S65 is executed. On the other hand, when the determination result of step S64 is negative, the process of step S61 is executed again.

In step S65, the CPU 81 displays a game image on the display 12 and outputs a game sound such as a BGM or a sound effect from the speakers 88. The process of step S65 is similar to the process of step S61. In the exemplary embodiment, during a period after the end of the sample period, the process of step S65 is executed at a rate of once per a predetermined period of time (i.e., one frame period), thereby outputting a moving image of the game image and a game sound. The process of step S66 is executed, following step S65.

In step S66, the CPU 81 determines whether or not it is during the copy period. That is, the CPU 81 determines whether or not the current point in time is after the start of the copy period and before the end of the copy period. When the determination result of step S66 is affirmative, the process of step S67 is executed. On the other hand, when the determination result of step S66 is negative, the process of step S65 is executed again.

In step S67, the CPU 81 obtains operation data from the left controller 3. The process of step S67 is similar to the process of step S2 of the first game process. The process of step S68 is executed, following step S67.

In step S68, the CPU 81 determines whether or not a copy operation has been detected. That is, the CPU 81 reads out operation data stored in the DRAM 85 to determine whether or not a copy operation has been performed based on the read-out operation data. Note that the specific process for detecting a copy operation is performed by the method described in "(Outline of fourth game example)" above. When the determination result of step S68 is affirmative, the process of step S69 is executed. On the other hand, when the determination result of step S68 is negative, the process of step S70 is executed again, skipping the process of step S69.

In step S69, the CPU 81 vibrates the left controller 3. The process of step S69 is similar to the process of step S4 of the first game process. The process of step S70 is executed, following step S69.

In step S70, the CPU 81 determines whether or not to end the copy period. That is, the CPU 81 determines whether or not a predetermined point in time that is at the end of the copy period has come. When the determination result of step S70 is affirmative, the process of step S71 is executed. On the other hand, when the determination result of step S70 is negative, the process of step S65 is executed again.

In step S71, the CPU 81 evaluates the game operation performed by the player. That is, the CPU 81 reads out operation data stored in the DRAM 85 to evaluate the game operation based on the read-out operation data. Note that the specific evaluation process performed by the method described in "(Outline of fourth game example)" above. In step S71, the CPU 81 notifies the player of the evaluation result. That is, the CPU 81 generates a game image representing the evaluation result (e.g., a game image representing a score), and displays the game image on the display 12. After step S71, the CPU 81 ends the fourth game process shown in FIG. 17.

Note that in the first to fourth game examples, the process step (step S15, S31, S51, S71) of evaluating the game operation is executed after the end of the period in which operations are performed by the player. In other embodiments, the process step of evaluating the game operation may be executed in real time in response to an operation performed by the player. For example, the process of evaluating whether or not the player performs a copy operation to the beats of the sample pattern in step S71 described above may be executed in response to the determination result of step S68 becoming affirmative.

[4. Summary of Embodiment Above and Variations Thereof]

An information processing system of the above embodiment is a game system including the following elements:

an operation section (controller);
a vibrating portion (the vibrator 107 or 117) provided in the same casing as the operation section;
a game process section configured to perform a game process based on an output from the operation section (the CPU 81 executing step S15, etc.); and
a vibration signal output section configured to output, to the vibrating portion, a vibration signal to cause the vibrating portion to produce a series of vibrations at predetermined points in time during the game process (the CPU 81 executing step S4, etc.),
wherein the game process section evaluates a game operation based on operations performed using the operation section in relation to the predetermined points in time (the first to third game examples).

Herein, the "output from the operation section" may be an output from an inertia sensor (i.e., an acceleration sensor and/or an angular velocity sensor) as in the above embodiment, or may be an output from an input device such as a button or an analog stick in other embodiments.

In the above embodiment, the "vibration signal" is a command that is transmitted from the main body apparatus 2 to the left controller 3 (assuming that the "vibrating portion" includes the vibrator 107 and the communication control section 111), or a control signal that is output from the communication control section 111 to the vibrator 107 (assuming that the "the vibrating portion" includes the vibrator 107).

The "operations performed using the operation section in relation to the predetermined points in time" may be operations performed using the operation section at the predetermined points in time or may be operations performed using the operation section at points in time or during a period of time that are or is identified based on the predetermined points in time.

In the second to fourth game examples, the vibration signal output section outputs, to the vibrating portion, a vibration signal to vibrate the vibrating portion to a predetermined pattern during the game process. Then, the game process section evaluates the game operation based on the predetermined pattern (the predetermined rhythm of the second and third game examples or the sample pattern of the fourth game example) and points in time when predetermined operations are performed using the operation section.

In other embodiments, the predetermined pattern is not limited to those with respect to a single type of input operation, but may be those with respect to a plurality of types of input operations. For example, the information processing system 1 may accept a plurality of types of operations in which the controller is moved in different directions (in other words, the controller is swung), in which case the predetermined pattern may be a pattern with respect to a plurality of types of operations. Specifically, when the information processing system 1 accepts a vertical swing operation of moving the controller in the vertical direction and a horizontal swing operation of moving the controller in the horizontal direction, the predetermined pattern may be a pattern with respect to a combination of the vertical swing operation and the horizontal swing operation (e.g., a pattern in which the horizontal swing operation is performed once after the vertical swing operation is performed twice).

In the first to fourth game examples, a display section (i.e., the display 12) displays an game image of the game process not including an image representing points in time at which the vibrating portion vibrates. In other embodiments, the information processing system 1 may display, on the display section, a game image representing points in time at which the vibrating portion vibrates. Also in such a case, the player can recognize, by way of vibrations of the controller, the points in time at which operations are performed, and the player can perform operations without looking at the game image.

In the above embodiment, the information processing system 1 includes an information processing device (i.e., the main body apparatus 2) including at least the game process section and the display section. In other embodiments, the game process section and the display section may be separate from each other. For example, in the above embodiment, the game process may be executed on the main body apparatus 2, and the game image generated by the game process may be displayed on a display device (e.g., the stationary monitor described above) separate from the main body apparatus 2.

In the above embodiment, the information processing system 1 includes a sound output section (i.e., the speakers 88) configured to output a sound representing a point in time at which the vibrating portion vibrates. In other embodiments, the information processing system 1 may output no game sound representing a point in time at which the vibrating portion vibrates, or may output a game sound that is irrelevant to the point in time at which the vibrating portion vibrates.

In the above embodiment, the game operation is a controller moving operation. That is, the information processing system 1 includes a controller device (i.e., the controller) including the operation section and the vibrating portion. The controller device includes an inertia sensor (i.e., the acceleration sensor and/or the acceleration sensor). The information processing system 1 senses an operation associated with the position and/or the orientation of the controller device (i.e., the operations in the first to fourth game examples) based on the output of the inertia sensor, and evaluates the game operation based on the operation.

In other embodiments, the game operation is not limited to an operation of moving the controller device but may be any other operation. For example, in other embodiments, it may be an operation of pressing a button of the controller or an operation using a touch panel. For example, when the game system (in other words, the information processing system 1) is a portable information processing device, the game operation may be performed through an operation of pressing a button of the information processing device and/or an operation of using a touch panel of the information processing device.

The above embodiment is applicable to a game system or a game program, for example, with the aim of allowing the player to perform operations freely.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

The invention claimed is:

1. A tactile game system of the type including a controller device that generates signals in response to user manipulation, the tactile game system comprising:
   a vibrator provided in a same casing as the controller device; and
   a computer system including at least one computer processor,
   wherein the computer system is configured to:
      perform a tactile game in response to signals from the controller device;
      output, to the vibrator, a vibration signal to cause the vibrator to produce a temporal pattern of vibrations comprising a sequence of vibrations at predetermined points in time during the game;
      sense user manipulations of the controller device;
      evaluate a game operation based on user manipulation of the controller device in relation to the temporal pattern of vibrations comprising the sequence of vibrations at predetermined points in time during the game, by comparing timing of said temporal pattern of vibrations of the vibrator with timing of sensed user manipulation of the controller device to determine time relation between said temporal pattern of vibrations of the vibrator and the timing of sensed user manipulation of the controller device; and
      controlling non-visual aspects of the tactile game in response to the determined time relation.

2. The tactile game system according to claim 1, wherein:
   the game system comprises a controller including the controller device and the vibrator;
   the controller includes an inertia sensor; and
   the computer system is configured to sense an operation associated with a position and/or an orientation of the controller based on an output of the inertia sensor during the game process to evaluate the game operation based on the sensed operation.

3. The tactile game system according to claim 2, wherein the computer system is configured to evaluate the game operation based on a motion, a position and/or an orientation of the controller that is identified based on the output of the inertia sensor at points in time that are based on the points in time at which the vibrator vibrates during the game process.

4. The tactile game system according to claim 2, wherein the computer system is configured to evaluate the game operation based on a magnitude of a motion of the controller that is identified based on the output of the inertia sensor over periods of time that are determined based on the points in time at which the vibrator vibrates during the game process.

5. The tactile game system according to claim 2, wherein the computer system is configured to:
   detect predetermined operations associated with a position and/or an orientation of the controller based on the output of the inertia sensor.

6. The tactile game system according to claim 1, further comprising a display device configured to display a game image of the game process, the game image not including an image representing the points in time at which the vibrator vibrates.

7. The tactile game system according to claim 6, comprising an information processing device configured to execute the game process, the information processing device including at least the display device.

8. The tactile game system according to claim 1, further comprising a speaker configured to output a sound representing the points in time at which the vibrator vibrates.

9. A tactile game system of the type including a controller device that generates signals in response to user manipulation, the tactile game system comprising:
   a vibrator provided in a same casing as the controller device; and
   a computer system including at least one computer processor,
   wherein the computer system is configured to:
      perform a tactile game in response to signals from the controller device;
      output, to the vibrator, a vibration signal to vibrate the vibrator to a predetermined temporal pattern during the game; and
      sense user manipulations of the controller device;
      evaluate a game operation based on points in time at which predetermined user manipulations of the controller device are sensed in timed relation to the predetermined temporal pattern of vibrations of the vibrator and during the game, by comparing timing of said temporal pattern of vibrations of the vibrator with timing of sensed predetermined user manipulation of the controller device to determine time relation between said temporal pattern of vibrations of the vibrator and the timing of sensed predetermined user manipulation of the controller device; and
      controlling non-visual aspects of the tactile game in response to the determined time relation.

10. The tactile game system according to claim 9, wherein:
    the game system comprises a controller including the controller device and the vibrator;
    the controller includes an inertia sensor; and
    the computer system is configured to sense an operation associated with a position and/or an orientation of the controller based on an output of the inertia sensor during the game to evaluate the game operation based on the sensed operation.

11. The tactile game system according to claim 10, wherein the computer system is configured to evaluate the game operation based on a motion, a position and/or an orientation of the controller that is identified based on the output of the inertia sensor at points in time that are based on the points in time at which the vibrator vibrates during the game.

12. The tactile game system according to claim 2, wherein the computer system is configured to evaluate the game operation based on a magnitude of a motion of the controller that is identified based on the output of the inertia sensor over periods of time that are determined based on the points in time at which the vibrator vibrates during the game.

13. The tactile game system according to claim 10, wherein the computer system is configured to:
  detect predetermined operations associated with a position and/or an orientation of the controller based on the output of the inertia sensor; and
  evaluate the game operation based on a comparison between a pattern of vibrations of the vibrator and the points in time at which the predetermined operations are performed.

14. The tactile game system according to claim 9, further comprising a display device configured to display a game image of the game process, the game image not including an image representing the points in time at which the vibrator vibrates.

15. The tactile game system according to claim 14, comprising an information processing device configured to execute the game process, the information processing device including at least the display device.

16. The tactile game system according to claim 9, wherein further comprising a speaker configured to output a sound representing the points in time at which the vibrator vibrates.

17. A non-transitory computer-readable storage medium storing a tactile game program to be executed on a computer system of an information processing system, wherein:
  the information processing system includes:
    a controller device; and
    a vibrator provided in a same casing as the controller device; and
  the game program instructs the computer system to:
    perform a tactile game in response to signals from the controller device, including sensing user manipulations of the controller device; and
    produce a temporal pattern of vibrations of the vibrator comprising a series of vibrations at predetermined points in time during the game; and
    the computer system evaluates a game operation based on user manipulation of the controller device in timed relation to the temporal pattern of vibrations comprising the series of vibrations at predetermined points in time during the game, by comparing timing of said temporal pattern of vibrations of the vibrator with timing of sensed user manipulation of the controller device to determine time relation between said temporal pattern of vibrations of the vibrator and the timing of sensed user manipulation of the controller device; and
    controlling non-visual aspects of the tactile game in response to the determined time relation.

18. The storage medium according to claim 17, wherein: the computer system vibrates the vibrator to a predetermined rhythm; and
  the computer system evaluates the game operation based on a difference between the predetermined rhythm and a rhythm to which predetermined operations are performed using the controller device during the game process.

19. The storage medium according to claim 17, wherein the computer system evaluates the game operation based on operations performed using the controller device at points in time or a period of time that are or is determined based on the points in time at which the vibrator vibrates during the game process.

20. The storage medium according to claim 17, wherein:
  the information processing system includes a controller comprising the controller device and the vibrator;
  the controller includes an inertia sensor; and
  the computer system senses an operation associated with a position and/or an orientation based on an output of the inertia sensor during the game process to evaluate the game operation based on the sensed operation.

21. The storage medium according to claim 20, wherein the computer system evaluates the game operation based on a motion, a position and/or an orientation of the controller identified based on an output of the inertia sensor at points in time that are based on the points in time at which the vibrator vibrates during the game.

22. The storage medium according to claim 20, wherein the computer system evaluates the game operation based on a magnitude of a motion of the controller that is identified based on an output of the inertia sensor during a period of time that is determined based on the points in time at which the vibrator vibrates during the game.

23. The storage medium according to claim 20, wherein:
  the computer system is configured to:
    detect predetermined operations associated with a position and/or an orientation of the controller based on the output of the inertia sensor; and
    evaluate the game operation based on a comparison between a pattern of vibrations of the vibrator and the points in time at which the predetermined operations are performed.

24. A non-transitory computer-readable storage medium storing a tactile game program to be executed on a computer system of an information processing system, wherein:
  the information processing system includes:
    a controller device; and
    a vibrator provided in a same casing as the controller device; and
  the game program instructs the computer system to:
    sense user manipulation of the controller device and produce output signals in response thereto;
    perform a tactile game in response to the signals from the controller device; and
    cause the vibrator to vibrate to a predetermined temporal pattern during the game; and
    the computer system evaluates a game operation based on the predetermined pattern and points in time at which predetermined operations are performed using the controller device during the game, by comparing timing of said temporal pattern of vibrations of the vibrator with timing of sensed user manipulation of the controller device to determine time relation between said temporal pattern of vibrations of the vibrator and the timing of sensed user manipulation of the controller device; and
    controlling non-visual aspects of the tactile game in response to the determined time relation.

25. The storage medium according to claim 24, wherein:
  the computer system vibrates the vibrator to a predetermined rhythm; and
  the computer system evaluates the game operation based on a difference between the predetermined rhythm and a rhythm to which predetermined operations are performed using the controller device during the game.

26. The storage medium according to claim 24, wherein the computer system evaluates the game operation based on a difference between beats of the predetermined pattern and points in time at which predetermined operations are performed using the controller device during the game process.

27. The storage medium according to claim 24, wherein: the computer system causes the vibrator to produce vibrations of the predetermined pattern before a predetermined operation period; and the computer system evaluates the game operation, during the game, based on a comparison between points in time at which an operation is performed using the controller device during the predetermined operation period and the predetermined pattern.

* * * * *